(12) United States Patent
Boldt et al.

(10) Patent No.: US 9,990,225 B2
(45) Date of Patent: *Jun. 5, 2018

(54) RELAXING TRANSACTION SERIALIZABILITY WITH STATEMENT-BASED DATA REPLICATION

(71) Applicant: International Business Machines Corporation, Armonk, NY (US)

(72) Inventors: Thomas P. Boldt, Markham (CA); Sunil K. Sarin, Newton, MA (US); Dirk A. Seelemann, II, Thornhill (CA); Glenn P. Steffler, Markham (CA)

(73) Assignee: International Business Machines Corporation, Armonk, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 14/695,870

(22) Filed: Apr. 24, 2015

(65) Prior Publication Data
US 2016/0246864 A1   Aug. 25, 2016

Related U.S. Application Data

(63) Continuation of application No. 14/629,331, filed on Feb. 23, 2015.

(51) Int. Cl.
*G06F 9/46* (2006.01)
*G06F 17/30* (2006.01)

(52) U.S. Cl.
CPC ........ *G06F 9/466* (2013.01); *G06F 17/30283* (2013.01); *G06F 17/30575* (2013.01)

(58) Field of Classification Search
CPC ......... G06F 17/30575; G06F 17/30578; G06F 17/30368; G06F 17/30212; G06F 11/2076; G06F 9/466

(Continued)

(56) References Cited

U.S. PATENT DOCUMENTS

| | | | |
|---|---|---|---|
| 7,089,253 B2 | 8/2006 | Hinshaw et al. | |
| 7,146,366 B2 | 12/2006 | Hinshaw et al. | |

(Continued)

OTHER PUBLICATIONS

Barbara, D., H. Garcia-Molina, and B. Kogan, "Maintaining Availability of Replicated Data in a Dynamic Failure Environment", Dec. 31, 1986, IP.com Electronic Publication: Apr. 17, 2007, IPCOM000150199D. Retrieved from the Internet at <URL: http://ip.com/IPCOM/000150199>, Total 25 pp.

(Continued)

*Primary Examiner* — Robert W Beausoliel, Jr.
*Assistant Examiner* — Pedro J Santos
(74) *Attorney, Agent, or Firm* — Janaki K. Davda; Konrad, Raynes, Davda & Victor LLP

(57) ABSTRACT

Consistency of replicated data copies with statement-based replication is provided without requiring transaction serializability. At a subordinate replication node, a transaction start message, replicated data modification statements, and a transaction commit message are received for a next committed transaction from a master replication node, wherein the transaction start message carries a master transaction identifier, an invisibility list consisting of identifiers of other master transactions that had started and not yet committed when this master transaction started, and an earliest invisible master transaction identifier. The master transaction identifier, invisibility list, and earliest invisible transaction identifier are mapped to subordinate transaction identifiers to preserve an order of transaction identifiers from the master replication node. A subordinate transaction is started with the mapped subordinate transaction identifier and with an invisibility list consisting of the mapped subordinate transaction identifiers for the master invisibility list for execution of the received data modification statements.

9 Claims, 16 Drawing Sheets

(58) Field of Classification Search
USPC ....... 707/610, 634, 615, 640, 648, 639, 623, 707/638, 625, 695
See application file for complete search history.

(56) References Cited

U.S. PATENT DOCUMENTS

| | | | |
|---|---|---|---|
| 7,305,386 B2 | 12/2007 | Hinshaw et al. | |
| 8,285,684 B2 | 10/2012 | Prahlad et al. | |
| 8,495,010 B2 | 7/2013 | Moore et al. | |
| 8,656,218 B2 | 2/2014 | Erofeev | |
| 2002/0133507 A1* | 9/2002 | Holenstein | G06F 11/2064 |
| 2003/0145021 A1* | 7/2003 | Parkkinen | G06F 17/30575 |
| 2003/0208511 A1 | 11/2003 | Earl et al. | |
| 2005/0138252 A1 | 6/2005 | Gwilt | |
| 2006/0182050 A1 | 8/2006 | Dohm | |
| 2006/0200501 A1 | 9/2006 | Holenstein et al. | |
| 2006/0200533 A1* | 9/2006 | Holenstein | G06F 17/30578 709/208 |
| 2007/0055712 A1 | 3/2007 | Wolfgang et al. | |
| 2009/0157766 A1* | 6/2009 | Shen | G06F 11/2097 |
| 2010/0100529 A1* | 4/2010 | Erofeev | G06F 11/1456 707/610 |
| 2010/0250491 A1* | 9/2010 | Jin | G06F 17/30575 707/634 |
| 2011/0178984 A1* | 7/2011 | Talius | G06F 11/2094 707/634 |
| 2012/0011098 A1* | 1/2012 | Yamada | G06F 11/1443 707/623 |
| 2012/0303912 A1 | 11/2012 | Calder et al. | |
| 2013/0110774 A1 | 5/2013 | Shah et al. | |
| 2013/0198133 A1* | 8/2013 | Lee | G06F 17/30581 707/611 |
| 2014/0156596 A1 | 6/2014 | Chandra et al. | |
| 2015/0379105 A1 | 12/2015 | Quakkelaar et al. | |

OTHER PUBLICATIONS

Bantupalli, J., D. Bhatia, J. Sardina, and S. Zvinyatskovsky, "Method and System for providing an Infrastructure for Database Replication", IP.com Electronic Publication: Dec. 22, 2011, © Yahoo! 2011, IPCOM000213593D. Retrieved from the Internet at <URL: http://ip.com/IPCOM/000213593D>, Total 6 pp.

Berenson, H., P. Bernstein, J. Gray, J. Melton, E. O'Neil, and P. O'Neil, "A Critique of ANSI SQL Isolation Levels", Jun. 1995, Technical Report, MSR-TR-95-51, Proc. ACM SIGMOD 95, © ACM, Total 13 pp.

Mell, P. and T. Grance, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", National Institute of Standards and Technology, Jan. 2011, Total 7 pp.

Thomson, A., T. Diamond, S. Weng, K. Ren, P. Shao, and D.J. Abadi, "Calvin: Fast Distributed Transactions for Partitioned Database Systems", SIGMOD '12, May 20-24, 2012, Scottsdale, Arizona, USA, © 2012 ACM, Total 12 Pp.

Microsoft, "Concurrency Problems", [online], [Retrieved on Feb. 23, 2015]. Retrieved from the Internet at <URL: https://technet.microsoft.com/en-us/library/aa213029>, © 2015 Microsoft, Total 1 p.

Wikipedia, "Isolation (Database Systems)", [online], [Retrieved on Feb. 23, 2015]. Retrieved from the Internet at <URL: http://en.wikipedia.org/wiki/Isolation_%28database_systems%29>, last modified on Jan. 21, 2015, Total 9 pp.

List of IBM Patents or Patent Applications Treated as Related, Apr. 24, 2015, Total 2 pp.

U.S. Patent Application with U.S. Appl. No. 14/629,331, filed Feb. 23, 2015, entitled, "Relaxing Transaction Serializability With Statement-Based Data Replication", invented by T.P. Boldt et al., Total 63 pp.

Office Action dated Apr. 7, 2017, pp. 28, for U.S. Appl. No. 14/629,331, filed Feb. 23, 2015.

Response dated Jul. 19, 2017, pp. 12, to Office Action dated Apr. 7, 2017, pp. 28, for U.S. Appl. No. 14/629,331, filed Feb. 23, 2015.

Final Office Action, dated Oct. 19, 2017, for U.S. Appl. No. 14/629,331, filed Feb. 23, 2015 by T.P. Boldt et al., Total 25 pp.

Response to Final Office Action, dated Jan. 18, 2018, for U.S. Appl. No. 14/629,331, filed Feb. 23, 2015 by T.P. Boldt et al., Total 15 pp.

Notice of Allowance, dated Feb. 1, 2018, for U.S. Appl. No. 14/629,331, filed Feb. 23, 2015 by T.P. Boldt et al., Total 13 pp. [57.339 (Noa)].

* cited by examiner

RELAXING TRANSACTION SERIALIZABILITY WITH STATEMENT-BASED DATA REPLICATION

FIELD

Embodiments of the invention relate to relaxing transaction serializability with statement-based data replication.

BACKGROUND

Database replication refers to the electronic copying of data from a database in one computing system to a database in another computing system, so that data can be accessed from each of the computing systems and at, possibly, different geographic locations in parallel and so that data processing can continue despite outages or disasters, natural or otherwise, at individual systems and locations.

Thus, replication of data is often used to improve availability of the data to database software in case of system and communication failures, as well as more serious disasters, such as earthquakes or intended attacks. However, replication of data typically requires ensuring that all copies of the replicated data are kept consistent and up-to-date, except, possibly, for some small delay or replication latency. Most data replication techniques perform operations or data modification statements against some copy of the replicated data, and then capture the effects or changes of transactions against the replicated data and transmit these changes to other copies of the replicated data. With database languages (e.g., Structured Query Language (SQL)), however, a very simple data modification statement or transaction may result in a large volume of changes (e.g., to millions of database records), which causes replication latency to suffer because of the delay involved in transmitting this large volume of changes.

An alternative means of keeping replicated copies of data consistent is to transmit the actual data modification statements or operations, packaged into transactions to be applied to the database copy or copies. This statement-based approach to replication may reduce the communication overhead of transmitting changes and the amount of intermediate storage where that is needed for recording changes, thereby reducing replication latency. That is, statement-based data replication consumes less storage and bandwidth and reduces latency, especially for very large data warehouses. On the other hand, statement-based data replication is generally understood to be able to maintain consistency of replicated copies only when both of the following restrictions apply:

Determinism: The same data modification statements in a transaction are interpreted in exactly the same way at all replicated copies. Replicated data modification statements cannot refer to random-number generators, for example, or to non-replicated data that may not be present at or may be different at different replication nodes.

Serializability: The end effect of executing a collection of transactions has to be identical to the effect of executing those same transactions one at a time in some serial order. With statement-based data replication, the transactions appear to have executed (this does not imply actual serial execution) in the same serial order at all copies, in order to ensure that execution of the data modification statements in each transaction have identical effect on all copies.

These constraints generally need to be enforced by statement-based data replication systems. However, transaction serializability implementations, in those database systems that provide this, are generally expensive and inhibit transaction concurrency and throughput.

Thus, most database software has learned to live without transaction serializability, using instead weaker but more concurrent transaction isolation levels, such as Read Committed and Snapshot Isolation, and dealing with consistency concerns through corrective action, or compensation, in the application. These weaker isolation levels have not to date been usable with statement-based replication because of the generally accepted serializability restriction noted above.

SUMMARY

Provided is a method for relaxing transaction serializability with statement-based data replication. The method comprises: at a subordinate replication node, receiving, with a processor of a computer, a transaction start message, replicated data modification statements, and a transaction commit message for a next committed transaction from a master replication node, wherein the transaction start message carries a master transaction identifier, an invisibility list consisting of transaction identifiers of other master transactions that had started and not yet committed when this master transaction started, and an earliest invisible master transaction identifier; mapping the master transaction identifier, invisibility list, and earliest invisible transaction identifier to subordinate transaction identifiers to preserve an order of transaction identifiers from the master replication node; starting a subordinate transaction with the mapped subordinate transaction identifier and with an invisibility list consisting of the mapped subordinate transaction identifiers for the master invisibility list; executing the data modification statements using multi-version database concurrency control based on the invisibility list; and committing the subordinate transaction to achieve a same replicated database state on the subordinate replication node as on the master replication node.

Provided is a computer program product for relaxing transaction serializability with statement-based data replication. The computer program product comprises a computer readable storage medium having program code embodied therewith, the program code executable by at least one processor to perform: at a subordinate replication node, receiving, by the at least one processor, a transaction start message, replicated data modification statements, and a transaction commit message for a next committed transaction from a master replication node, wherein the transaction start message carries a master transaction identifier, an invisibility list consisting of transaction identifiers of other master transactions that had started and not yet committed when this master transaction started, and an earliest invisible master transaction identifier; mapping, by the at least one processor, the master transaction identifier, invisibility list, and earliest invisible transaction identifier to subordinate transaction identifiers to preserve an order of transaction identifiers from the master replication node; starting, by the at least one processor, a subordinate transaction with the mapped subordinate transaction identifier and with an invisibility list consisting of the mapped subordinate transaction identifiers for the master invisibility list; executing, by the at least one processor, the data modification statements using multi-version database concurrency control based on the invisibility list; and committing, by the at least one processor, the subordinate transaction to achieve a same replicated database state on the subordinate replication node as on the master replication node.

Provided is a computer system for relaxing transaction serializability with statement-based data replication. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: at a subordinate replication node, receiving a transaction start message, replicated data modification statements, and a transaction commit message for a next committed transaction from a master replication node, wherein the transaction start message carries a master transaction identifier, an invisibility list consisting of transaction identifiers of other master transactions that had started and not yet committed when this master transaction started, and an earliest invisible master transaction identifier; mapping the master transaction identifier, invisibility list, and earliest invisible transaction identifier to subordinate transaction identifiers to preserve an order of transaction identifiers from the master replication node; starting a subordinate transaction with the mapped subordinate transaction identifier and with an invisibility list consisting of the mapped subordinate transaction identifiers for the master invisibility list; executing the data modification statements using multi-version database concurrency control based on the invisibility list; and committing the subordinate transaction to achieve a same replicated database state on the subordinate replication node as on the master replication node.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments support statement-based data replication without requiring serializability, which widens its applicability. Also, embodiments permit more concurrent execution of transactions received by replicas.

Figure 1:
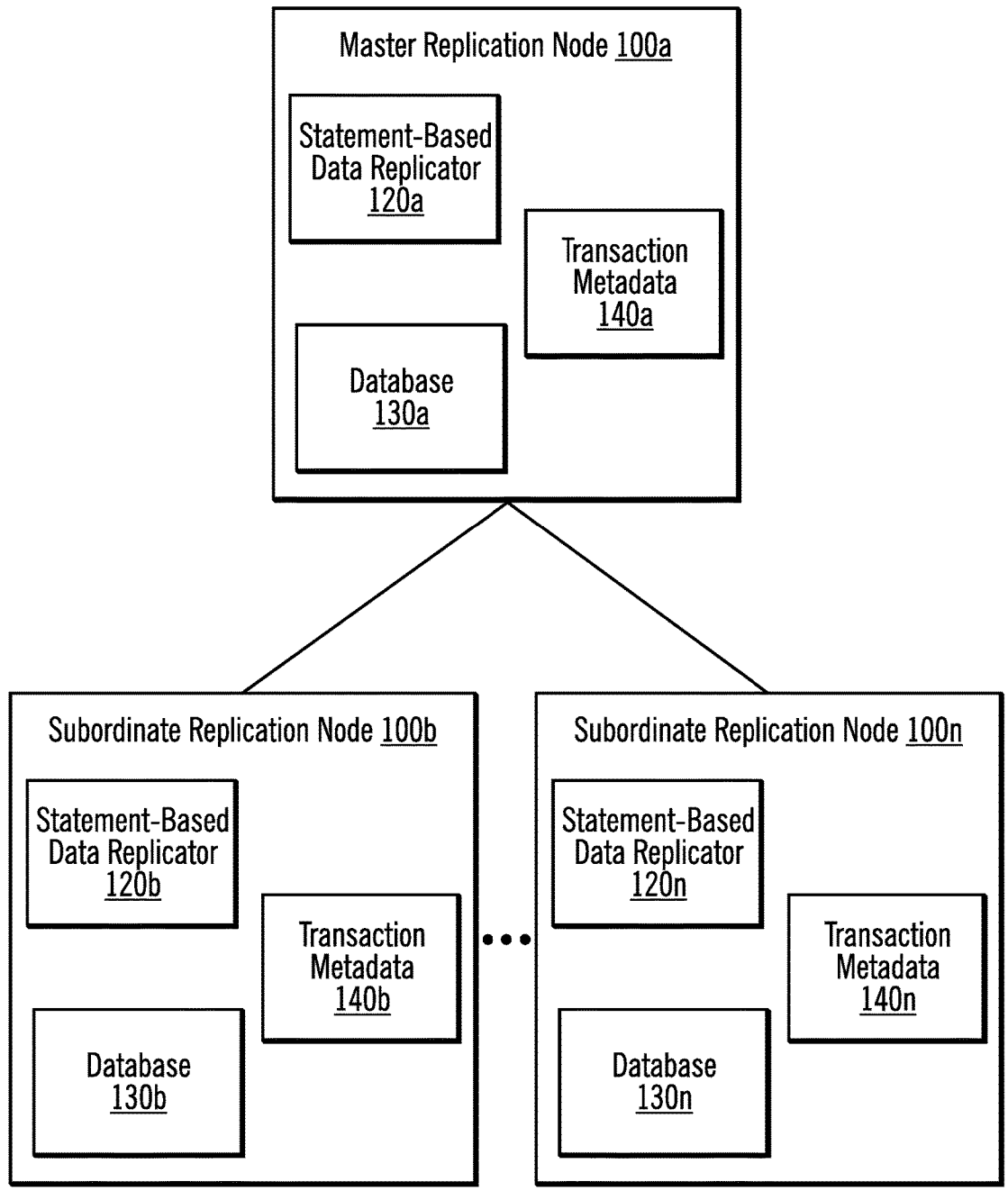
FIG. 1 illustrates, in a block diagram, a computing environment for a distributed and replicated database system in accordance with certain embodiments.

FIG. 1 illustrates, in a block diagram, a computing environment for a distributed and replicated database system in accordance with certain embodiments. The distributed database system consists of many replication nodes (at least one master (or "first") node and at least one subordinate (or "second") node), each of which may have different capabilities. In FIG. 1, the use of "a", "b", "n", and the ellipses are used to indicate that there may be any number of elements designated with those characters.

A master replication node 100a ("master replication system") is coupled to one or more subordinate replication nodes 100b . . . 100n ("subordinate replication systems"). Each master replication node 100a and subordinate replication node 100b . . . 100n includes a statement-based data replicator 120a . . . 120n, a database 130a . . . 130n, and transaction metadata 140a . . . 140n. The transaction metadata 140a . . . 140n includes, for each transaction, a master transaction identifier ("ID"), an invisibility list, and an earliest invisible transaction ID.

Embodiments of a replicated, distributed database system do not assume that all data is replicated between replication nodes. That is, each node may have a mix of replicated data (e.g., database tables) known to all replication nodes and non-replicated or local data that is known only to that replication node, and, similarly, replicated transactions that modify replicated data and non-replicated or local transactions that modify local data. In certain embodiments, the master replication node 100a is the sole source of modifications to replicated data. These modifications (in the form of the original statements executed on the master replication node 100a) are propagated to subordinate replication nodes 100b . . . 100n for execution after the corresponding replicated transactions have committed on the master replication node. The subordinate replication nodes 100b . . . 100n do not modify replicated data, except in response to modifications received from the master replication node 100a. There may be multiple subordinate replication nodes 100b . . . 100n in such a distributed database system. With embodiments, replicated transactions are executed on a subordinate replication node 100b . . . 100n in the order in which they committed on the master replication node 100a.

In various embodiments, each of the nodes 100a . . . 100n may be a master replication node or a subordinate replication node. For example, a node that is currently a subordinate replication node may be a master replication node with respect to different data. A node that is current a master replication node may at some future time become a subordinate replication node, and vice versa, for disaster recovery. The description herein is simplified in terms of a single master replication node (and one or more subordinate replication nodes), but is understood to apply equally to more general environments with different master replication nodes over time or for different data.

The master replication node 100a is capable of originating new transactions. These transactions may execute queries, including modifications, against data that reside in the local database 130 on the master replication node 100a. The subordinate replication nodes 100b . . . 100n replicate the data in database 130a at the master replication node 100a into databases 130b . . . 130n.

Databases 130a . . . 130n may be organized into database tables that consist of rows (also referred to as tuples or database records) and columns (also referred to as fields or attributes) of data. A query may be described as a request for information from a database 130a . . . 130n based on specific conditions. A query typically includes one or more predicates. A predicate may be described as an element of a search condition that expresses or implies a comparison operation (e.g., A=3). One type of database software is Relational DataBase Management System (RDBMS) software, which uses a Structured Query Language (SQL) interface. A RDBMS uses relational techniques (e.g., an index) for storing and retrieving data in a relational database. 'The techniques described herein are applicable to any transactional database management system, whether it supports SQL against tables or other operations against other data structures (such as "key-value stores" in "NoSQL" data management systems).

Multi-Version Database and Transaction Visibility

Embodiments rely on a multi-version database in which readers and writers do not block each other (i.e., a reader may access an earlier version of data that a writer is changing).

With embodiments, each stored database record in each database 130a . . . 130n is tagged with three additional internal columns:

A unique row identifier ("rowid").
An identifier of the transaction that created or inserted this database record ("insertxid").
An identifier of the transaction, if any, that deleted this database record ("deletxid").

Insert statements on a database table create new database records, and each of the database records has a newly-assigned unique rowid, an insertxid for the identifier of the inserting transaction, and a deletxid that is not set (this may be represented in some embodiments by a database NULL value or by a special value that is not a legal transaction id).

Delete statements on a database table update the deletxid column of existing database records with the identifier of the deleting transaction.

Update statements on a database table are processed as a combination of an insert statement and a delete statement. That is, new copies of the database records to be updated are inserted, with the same or new rowids, but with column values copied or changed as specified in the update statement, and with insertxid as the identifier of the updating transaction; and existing database records that are to be updated have the deletxid column updated with the identifier of the updating transaction.

The way in which the above column values are used in controlling transaction visibility and concurrency is based on monotonically increased transaction identifiers ("IDs") That is, transaction IDs are assigned in increasing order at transaction start time. The consistency/visibility that is provided, which is for the most part equivalent to SQL Standard Repeatable Read isolation, is that each transaction sees a state (i.e., a collection of database record versions) of the database that reflects just those transactions that had committed at the time the given transaction started. Subsequent commits of other transactions that occur while the given transaction is still active (has not committed or rolled back) are not visible to the given transaction.

Figure 2:
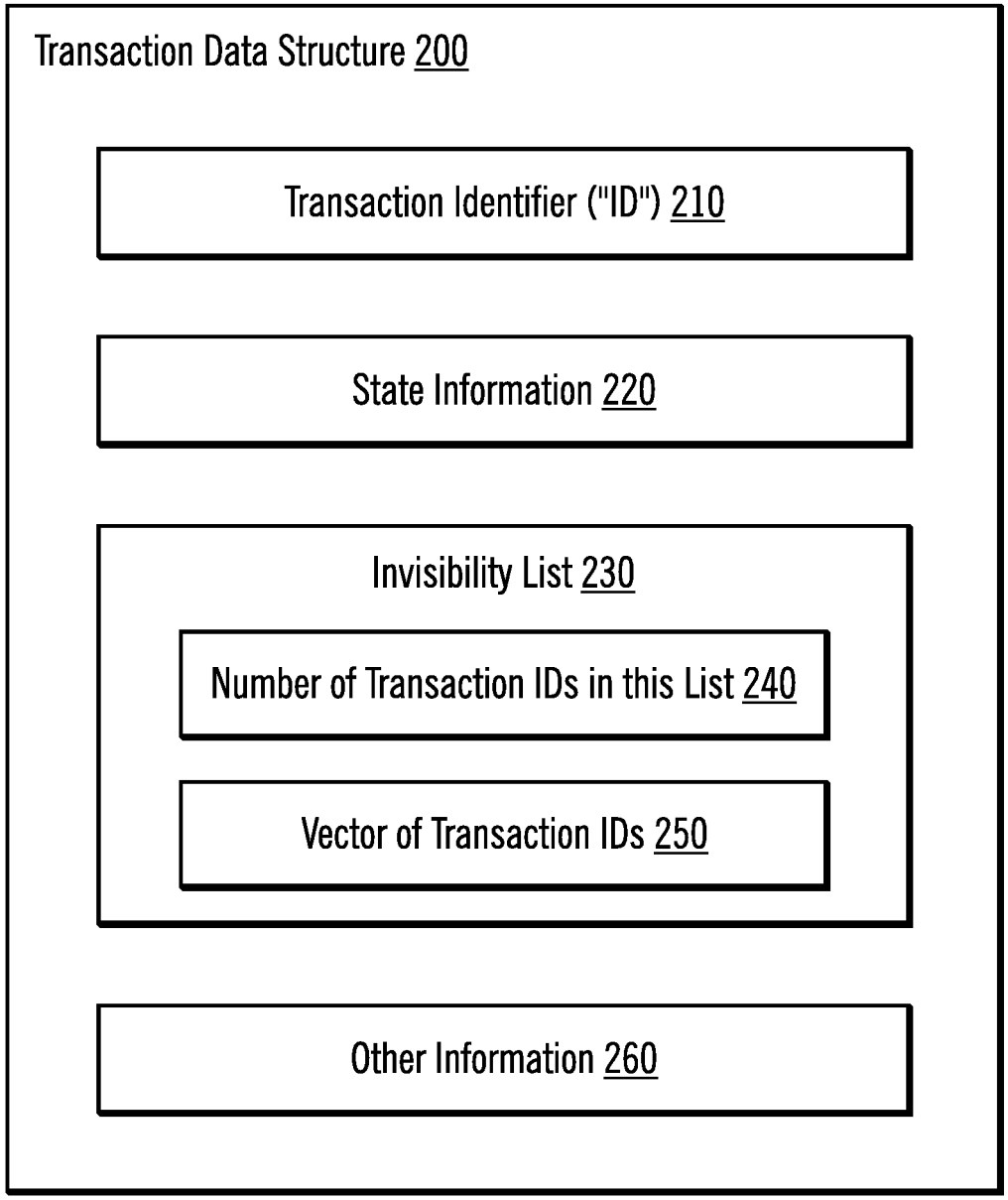
FIG. 2 illustrates a block diagram showing the elements of a transaction data structure used to represent a transaction in accordance with certain embodiments.

FIG. 2 illustrates a block diagram showing the elements of a transaction data structure 200 used to represent a transaction in accordance with certain embodiments. The transaction data structure 200 contains a transaction identifier ("ID") 210 that is assigned to the transaction when the transaction is created.

The transaction data structure 200 also contains state information 220, including an indication of whether the transaction is active, committed or aborted. For example, when the transaction is started, the state of the transaction is active, and, when the transaction has committed, the state of the transaction is committed.

A transaction data structure 200 also includes an invisibility list 230. Invisibility List information (240, 250) is used to control which version of a database record is visible to a transaction at a given time. The purpose of the invisibility list 230 is to encapsulate exceptions to the basic rule of visibility—namely that a transaction can by default see the changes produced by other transactions with transaction IDs that are less than or equal to its own transaction ID, but cannot see the changes produced by transactions with transaction IDs that are greater than its own transaction ID.

The invisibility list 230 contains a vector of transaction IDs 250, along with the total number of transaction IDs in the vector 240. Each transaction ID in the vector 250 represents a transaction that is to be invisible to the transaction, even though the transaction ID in the vector is ordered before the transaction ID 210 of the transaction.

A transaction 200 may also record other information 260 including, but not limited to, a transaction start time and transaction end time.

To provide the desired snapshot isolation, when a transaction is started, the transaction is given the invisibility list that consists of the identifiers of transactions that have started but not yet committed or rolled back. The invisibility list of transaction T will be referred to as InvisList(T) herein. The pair<T, InvisList(T)> will be referred to as a transaction descriptor for convenience. When a transaction T issues a query against the database (where query includes Insert, Delete, and Update, as well as Select statements), the set of database records visible to T in its consistent database snapshot is defined in terms of database record insertxids and deletxids as follows. A database record R is visible to T if and only if all of the following are true:

insertxid(R) is less than or equal to T;
insertxid(R) does not appear in InvisList(T);
deletxid(R) is not set or is greater than T or appears in InvisList(T).

All other database records R are not visible to T, either because insertxid(R) is greater than T or is in InvisList(T) or because deletxid(R) is less than or equal to T and does not appear in InvisList(T).

Repeatable Read, Serializability, and Snapshot Isolation

Using the invisibility lists in this manner, embodiments provide SQL Standard Repeatable Read isolation (and possibly a little more, if the embodiment also avoids the phantom anomaly). Serializable transaction isolation can be provided using additional, conventional mechanisms.

An alternative to serializability that provides for greater concurrency at the cost of slightly weaker consistency is snapshot isolation. Snapshot isolation may be achieved with the multi-version transaction visibility model by checking for and disallowing updates or deletes of the same database record from concurrent transactions (where two transactions are concurrent if neither one committed before the other one started and therefore each is invisible to the other).

Replication Using Transaction Invisibility Lists

Embodiments support statement-based data replication with snapshot isolation, that is, without requiring serializable isolation, by effectively replicating transaction invisibility lists. A replicated transaction, executed originally on a master copy of replicated data in database 130 at the master replication node 100a, has both its database modification statements, as well as its transaction descriptor captured for transmission to the subordinate replication nodes 100b . . . 100n for use in updating copies of the replicated data in databases 130b . . . 130n. Each subordinate replication node 100b . . . 100n maps the transaction IDs that appear in transaction descriptors from the master replication node 100a to subordinate transaction IDs in a manner that preserves the order of master transaction IDs, and then executes a given master replicated transaction using a transaction descriptor that has the mapped transaction IDs corresponding to the transaction IDs in the master transaction descriptor. With this, each replicated transaction, when executed at a subordinate replication node 100b . . . 100n, produces the same effect on the replicated data as the original master transaction.

Embodiments achieve the compactness and replication latency benefits of statement-based replication without requiring transaction serializability. Embodiments are applicable even in the case where transactions against replicated data are serializable (which as noted is also an option with multiple versions and transaction invisibility lists).

Embodiments achieve statement-based data replication when transactions execute under snapshot isolation (i.e., without a serializability guarantee). Embodiments ensure eventual consistency of master and subordinate data replicas, even though master replicated transactions do not execute in a way that allows for an equivalent serial order.

Relaxing Serializability with Replication

The statement-based data replicator 120a . . . 120n enables relaxing serializability with replication by mimicking master transaction invisibility lists on subordinate replication nodes 100b . . . 100n and by mapping master transaction IDs to subordinate transaction IDs in an order-preserving manner. With embodiments, the master replication node 100a does not have control over the assignment of transaction IDs on subordinate replication nodes 100b . . . 100n; that is, each node 100a . . . 100n has its own increasing transaction identifier ("ID") counter under its own local control.

Consider the following transaction execution on the master replication node 100a, where each Mi is a transaction ID assigned on the master replication node 100a and M0<M1<M2:

M0: <Replicated-Statement-0>
M1: <Replicated-Statement-1>
M0: Commit
M2: <Replicated-Statement-2>
M2: Commit
M1: Commit The following are invisibility lists for these three master transactions:

InvisList(M0)={ }
InvisList(M1)={M0}
InvisList(M2)={M1}

Since the transactions committed in the order M0, M2, M1 (note that M2 committed before M1 even though M1 started before M2 and M1<M2), this is the order in which the transactions and their statements are transmitted by the statement-based data replicator 120a on the master replication node 100a to the statement-based data replicator 120b . . . 120n at each of the subordinate replication nodes 100b . . . 100n for execution. Each such transaction carries transaction metadata of the corresponding master transaction id, invisibility list, and an earliest invisible transaction id, which is the smallest of the union of the following:

The transaction ID itself.
The transaction IDs on the invisibility list.
The transaction IDs on the invisibility lists of the transactions whose transaction IDs appear in this transactions invisibility list.

The earliest invisible transaction id of transaction T will be referred to as EarliestInvis(T) herein. Thus, EarliestInvis(M0)=M0; EarliestInvis(M1)=M0; EarliestInvis(M2)=M0, the last because M0 appears in the invisibility list of M1 which appears in the invisibility list of M2.

When a replicated transaction Mi arrives at a subordinate replication node 100b . . . 100n for execution, the statement-based data replicator 120b . . . 120n at the subordinate replication node 100b . . . 100n reserves local transaction IDs that correspond to each of EarliestInvis(Mi), InvisList(Mi), and Mi, in order of ascending master transaction id. Furthermore, once the statement-based data replicator 120a has reserved a transaction id, say Sj, for some master transaction Mj, the statement-based data replicator 120b . . . 120n at the subordinate replication node 100b . . . 100n records the mapping <Mj, Sj> so that if Mj appears again in the incoming transaction stream, the statement-based data replicator 120b . . . 120n at the subordinate replication node 100b . . . 100n uses the same reserved transaction ID Sj, rather than reserving a new one. The recorded transaction ID mappings are also used when a transaction execution failure or system failure interrupts execution of some replicated transaction on the subordinate replication node 100b . . . 100n: the same subordinate transaction ID and invisibility list will be used again for the re-execution of the transaction that failed or was interrupted.

Initially, when M0 arrives at the statement-based data replicator 120b . . . 120n of a subordinate replication node 100b . . . 100n, there are no prior master-subordinate transaction ID mappings, so the statement-based data replicator 120b . . . 120n reserves a new subordinate transaction ID S0 and records the mapping <M0, S0>. Then, the statement-based data replicator 120b . . . 120n executes the <Replicated-Statement-0> on the subordinate replication node 100b . . . 100n with transaction ID S0 and an empty invisibility list (since the master invisibility list of M0 was empty). Assuming the replicated data was initialized to be the same as on the master prior to executing M0, transaction S0 will produce the same effect on the subordinate replication node 100b . . . 100n as M0 did on the master replication node 100a.

Next, M2 arrives for execution, and the statement-based data replicator 120b . . . 120n at the subordinate replication node 100b . . . 100n reserves subordinate transaction IDs for M0 (which is EarliestInvis(M2)), M1 (which is the sole member of InvisList(M2), and M2 itself. Since M0 already has a recorded mapping to the reserved transaction ID S0, no new transaction ID is reserved for that. But the statement-based data replicator 120b at the subordinate replication node 100b . . . 100n reserves new transaction IDs S1 and S2 for M1 and M2, respectively and in order, such that S0<S1<S2. The statement-based data replicator 120b . . . 120n at the subordinate replication node 100b . . . 100n executes <Replicated-Statement-2> on the subordinate replication node 100b . . . 100n with transaction ID S2 and an invisibility list obtained by mapping the elements of InvisList(M2) to the corresponding reserved subordinate transaction IDs. Since InvisList(M2)={M1}, InvisList(S2) will be {S1}. This means that when <Replicated-Statement-2> executes on the subordinate replication node 100b . . . 100n, it will not see any changes made by a transaction with ID S1. No such transaction S1 has been executed yet on the subordinate replication node 100b . . . 100n, so the appearance of S1 in InvisList(S2) may not have an effect on the execution of S2. But since S0<S2 and S0 is not on InvisList(S2), the execution of S2 on the subordinate replication node 100b . . . 100n will see the replicated data modifications made by S0, and, therefore, produce the same effect on the subordinate replication node 100b . . . 100n as M2 did on the master replication node 100a (given that M1 is on InvisList(M2) but M0 is not).

Note that if some master replicated transaction $M_j$<M does not appear on M's invisibility list, then it would have committed on the master before M started (by virtue of invisibility list construction). Therefore, because the statement-based data replicator 120b . . . 120n at the subordinate replication node 100b . . . 100n executes replicated transactions in master commit order, the corresponding $S_j$<S would have committed on the subordinate before S starts. This is the case in the example above, with $M_j$=M0, M=M2, $S_j$=S0, and S=S2.

The reason for reserving S1 for master transaction M1 when executing M2 at the subordinate, even though M1 has not been seen by the subordinate, will be clear when M1 arrives at the subordinate for execution. At this point, S0 has already been reserved for master transaction M0, which is both equal to EarliestInvis(M1) and the only element of InvisList(M1), and S1 has already been reserved for M1 itself. So, the statement-based data replicator 120b . . . 120n at the subordinate replication node 100b . . . 100n executes <Replicated-Statement-1> with transaction ID S1 and invisibility list {S0}. This means that <Replicated-Statement-1>, when executed on the subordinate replication node 100b . . . 100n, will not see any data modifications made by <Replicated-Statement-0>, under transaction ID S0. Further, since S2>S1 (this was arranged by reserving a transaction ID for M1 when M2 arrived at the subordinate), <Replicated-Statement-1> will not see any data modifications made by <Replicated-Statement-2>, under transaction ID S2, either. Thus, <Replicated-Statement-1> under transaction ID S1 and invisibility list {S0}, sees exactly the same state of the replicated data that was seen by M1 on the master replication node 100a (because M2>M1 and InvisList(M1)={M0}). This ensures that S1 will produce the same effect on the subordinate replication node 100b . . . 100n as M1 did on the master replication node 100a, achieving consistency of the master and subordinate replicas.

Table 1 illustrates an example of recording subordinate transaction IDs in a master-to-subordinate transaction ID mapping, for the above scenario. For example, when M0 arrives, Table 1 contains only <M0, S0>. When M2 arrives, Table 1 contains (in ascending order)<M0, S0>, <M1, S1>, and <M2, S2>. When M1 arrives, the mapping to a subordinate transaction ID is already present for M1.

TABLE 1

| Master transaction ID | Subordinate transaction ID |
|---|---|
| M0 | S0 |
| M1 | S1 |
| M2 | S2 |

In the general case, assume that master replicated transaction M had EarliestInvis(M)=M0 and InvisList(M)={M1, . . . , Mk} where k>=0 and M0<=M1< . . . <Mk<M. By construction, EarlistInvis(M) is less than or equal to M and less than or equal to every transaction ID in InvisList(M). The statement-based data replicator 120b . . . 120n at the subordinate replication node 100b . . . 100n examines M0 (if different from M1 and M), M1, . . . , Mk, M in ascending order and for each one reserves a subordinate transaction id, if one was not already reserved and recorded, and records the mapping. Let the corresponding subordinate transaction IDs be S0 (if M0 was different from M1 and M), S1, . . . , Sk, and S. With embodiments, the order of the corresponding master transaction IDs is preserved, i.e., S0<=S1< . . . <Sk<S, because the master transaction IDs were visited in ascending order and because there could not have been any gaps in previously-reserved and recorded transaction IDs. That is, if some master transaction ID Mi, say, did not have a previously-reserved transaction ID mapping when it is visited, then neither can Mi+1, . . . , Mk, or M. This can be proved by contradiction. Mi not having a previously-reserved transaction id, when M arrives for execution on the subordinate, implies that it could not have been on the invisibility list of any transaction that committed on the master before M committed.

1. If some Mj>Mi did have a previously-reserved transaction ID when M arrives for execution on the subordinate, then Mj would have either committed on the master before M committed or appeared on the invisibility list of some transaction M1>Mj that committed on the master before M committed. Given that Mi<Mj and Mi<M1, Mi would have either have appeared on InvisList(Mj) or InvisList(M1) or have committed before M. In either case, Mi would have been visited and a subordinate transaction ID reserved for it prior to the subordinate visiting the transaction IDs associated with M.

2. Similarly, if M itself did have a previously-reserved transaction ID when M arrives for execution on the subordinate, then M would have appeared on the invisibility list of some transaction M1>M that committed on the master before M committed. Again, Mi would have either have appeared on InvisList(Mj) or InvisList(M1) or have committed before M. In either case, Mi would have been visited and a subordinate transaction ID reserved for it prior to the subordinate visiting the transaction IDs associated with M.

Having reserved or found subordinate transaction IDs S0, S1, . . . , Sk, S as described above, the data modification statement(s) in the master replicated transaction are executed with transaction ID S and invisibility list {S1, . . . , Sk}. The earliest invisible transaction ID S0 will be used below in our description of reclaiming deleted database records.

Figure 3A:
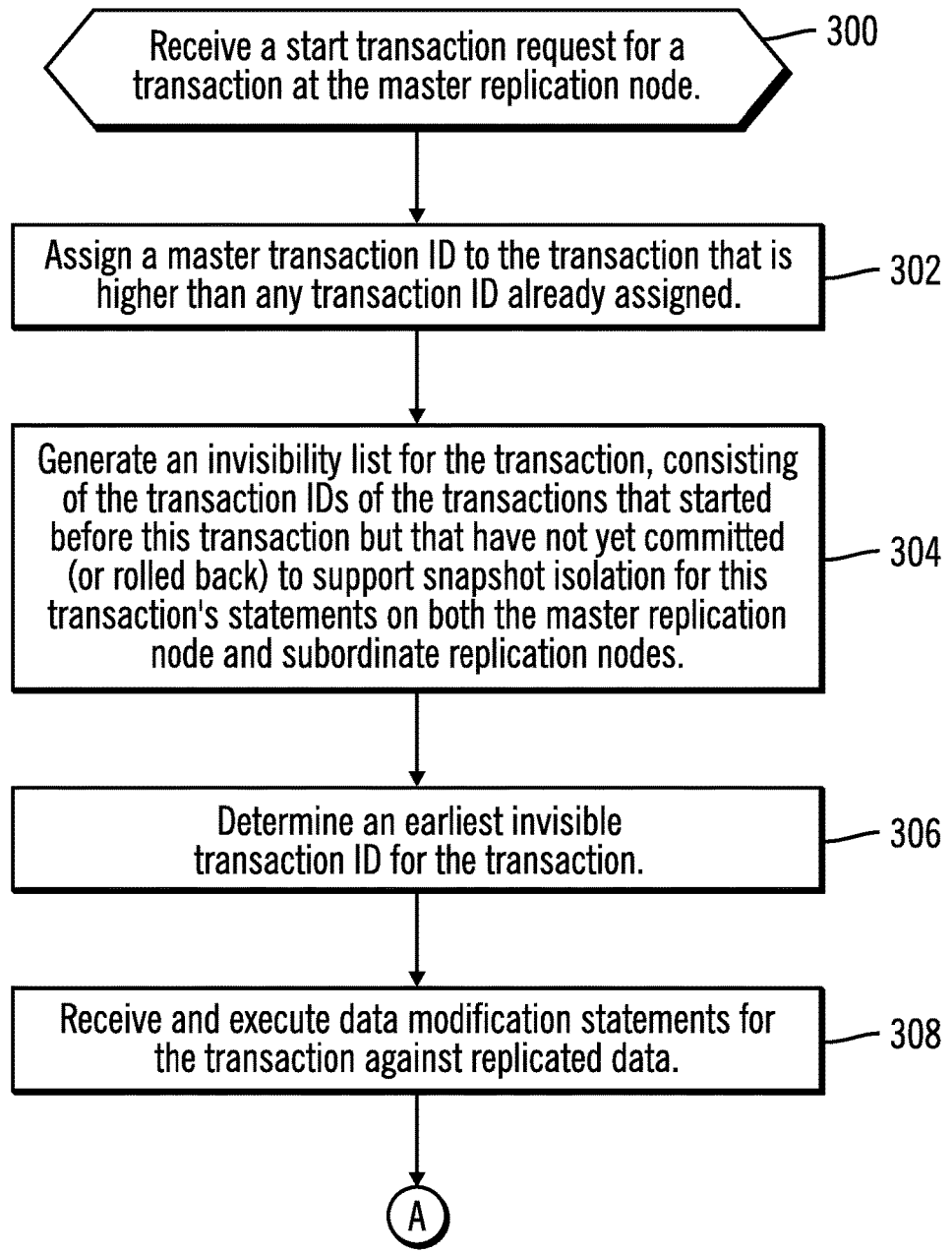
FIGS. 3A and 3B illustrate, in a flowchart, processing performed by a master replication node in accordance with certain embodiments.
Figure 3B:
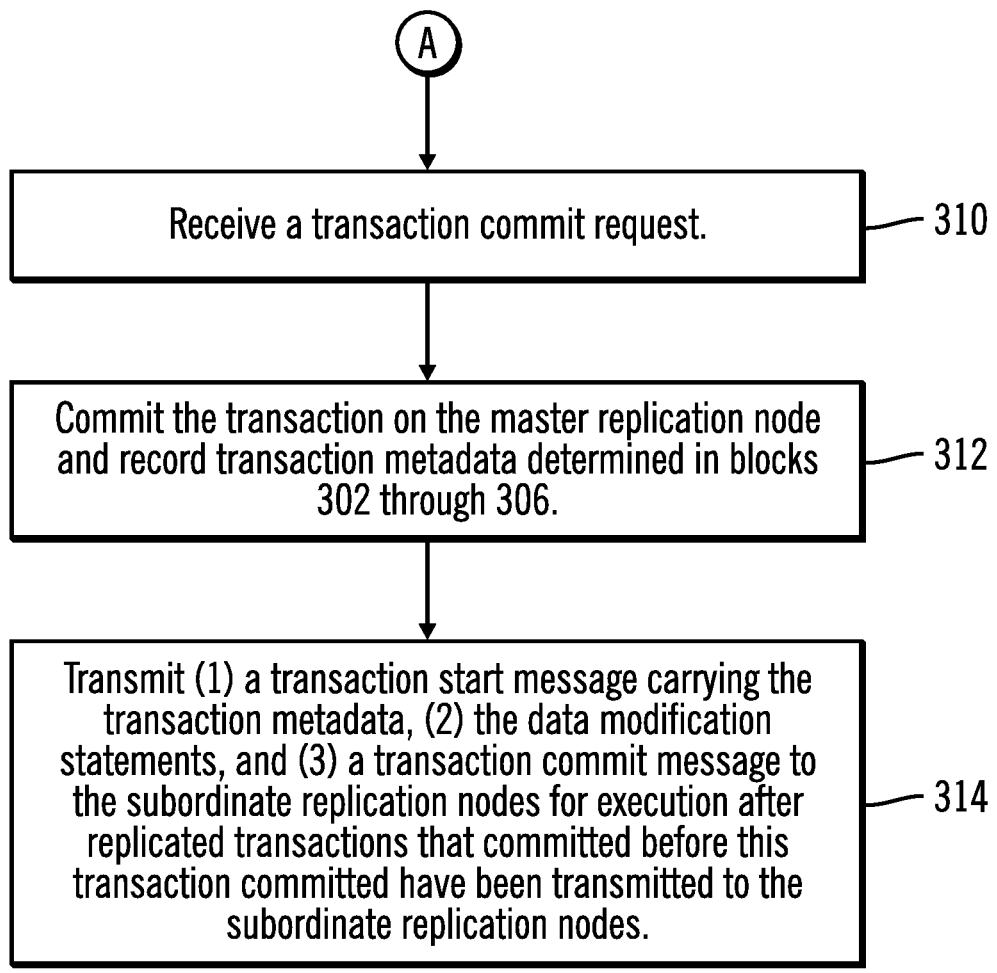

FIGS. 3A and 3B illustrate, in a flowchart, processing performed by a master replication node in accordance with certain embodiments. The processing of FIGS. 3A and 3B is for one transaction, and this processing is performed to completion for one committed replicated transaction but this processing may be repeated, possibly in parallel, for any number of transactions. Control begins at block 300 (FIG.

3A) with the statement-based data replicator 120a at the master replication node 100a receiving a start transaction request for a transaction. In block 302, the statement-based data replicator 120a at the master replication node 100a assigns a master transaction ID to the transaction that is higher than any transaction ID already assigned. In block 304, the statement-based data replicator 120a at the master replication node 100a generates an invisibility list for the transaction, consisting of the transaction IDs of the transactions that started before this transaction but that have not yet committed (or rolled back), to support snapshot isolation for this transaction's statements on both the master replication node and subordinate replication nodes. In block 306, the statement-based data replicator 120a at the master replication node 100a determines an earliest invisible transaction ID for the transaction.

In block 308, the statement-based data replicator 120a at the master replication node 100a receives and executes data modification statements for the transaction against replicated data. From block 308 (FIG. 3A), processing continues to block 310 (FIG. 3B).

In block 310, the statement-based data replicator 120a at the master replication node 100a receives a transaction commit request. In block 312, the statement-based data replicator 120a at the master replication node 100a commits the transaction and records transaction metadata determined in blocks 302 through 306. In block 314, the statement-based data replicator 120a at the master replication node 100a transmits (1) a transaction start message carrying the transaction metadata, (2) the data modification statements, and (3) a transaction commit message to subordinate replication nodes 100b . . . 100n for execution after replicated transactions that committed before this transaction committed have been transmitted to the subordinate replication nodes. With embodiments, these multiple logical messages may be sent as one or more physical network transmissions without loss of generality.

Figure 4A:
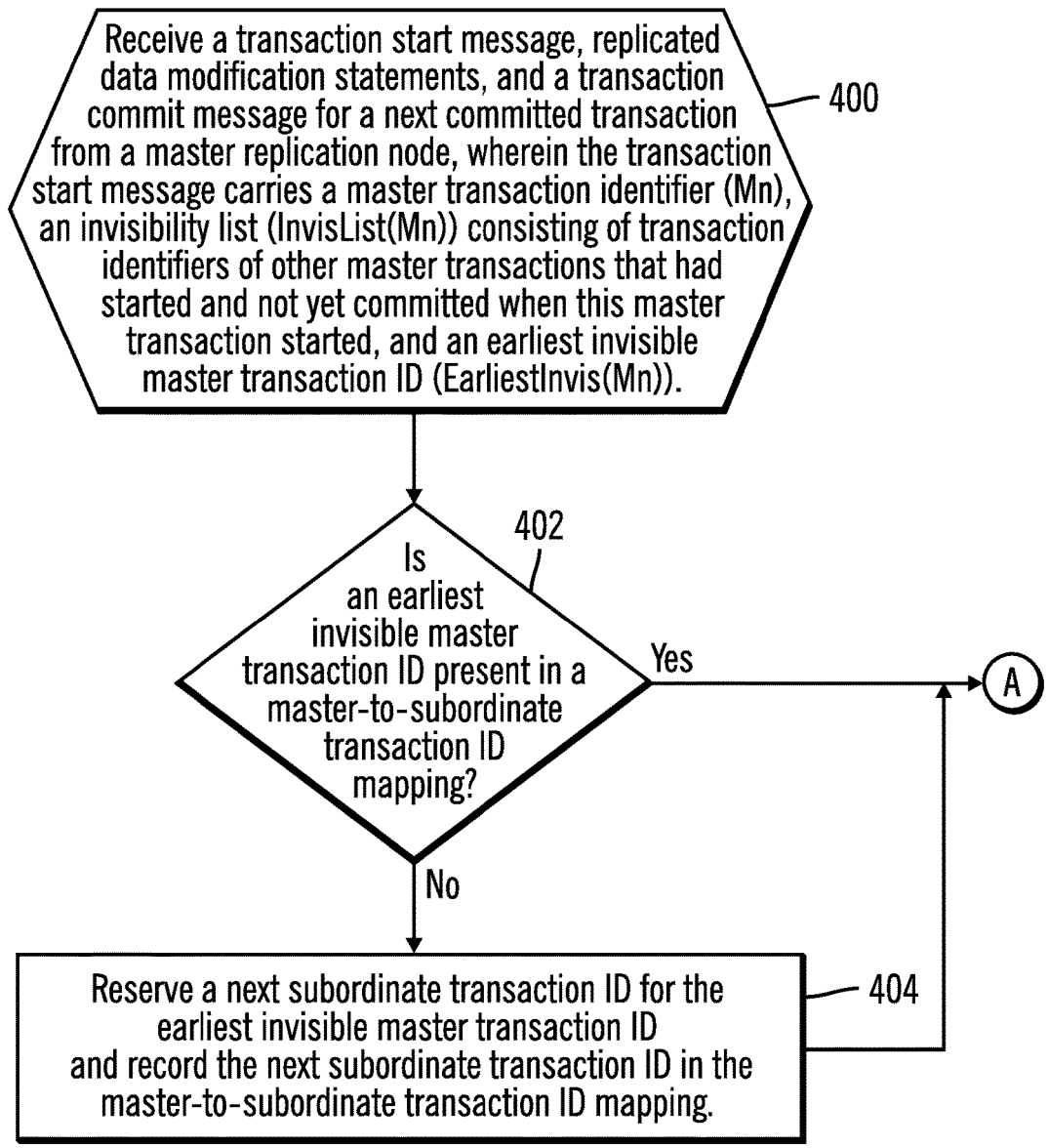
FIGS. 4A, 4B, and 4C illustrate, in a flowchart, processing performed by a subordinate replication node in accordance with certain embodiments.
Figure 4B:
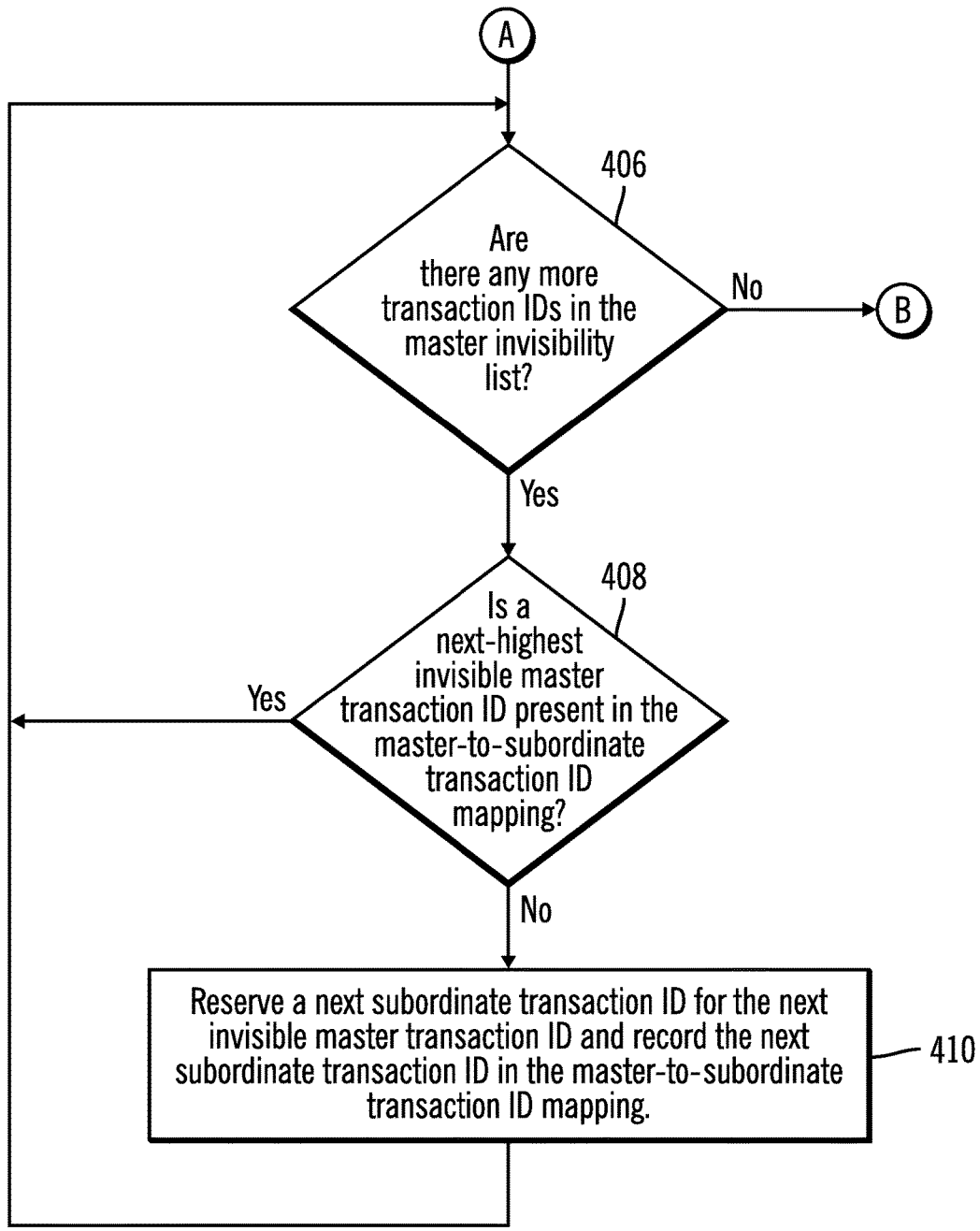
Figure 4C:
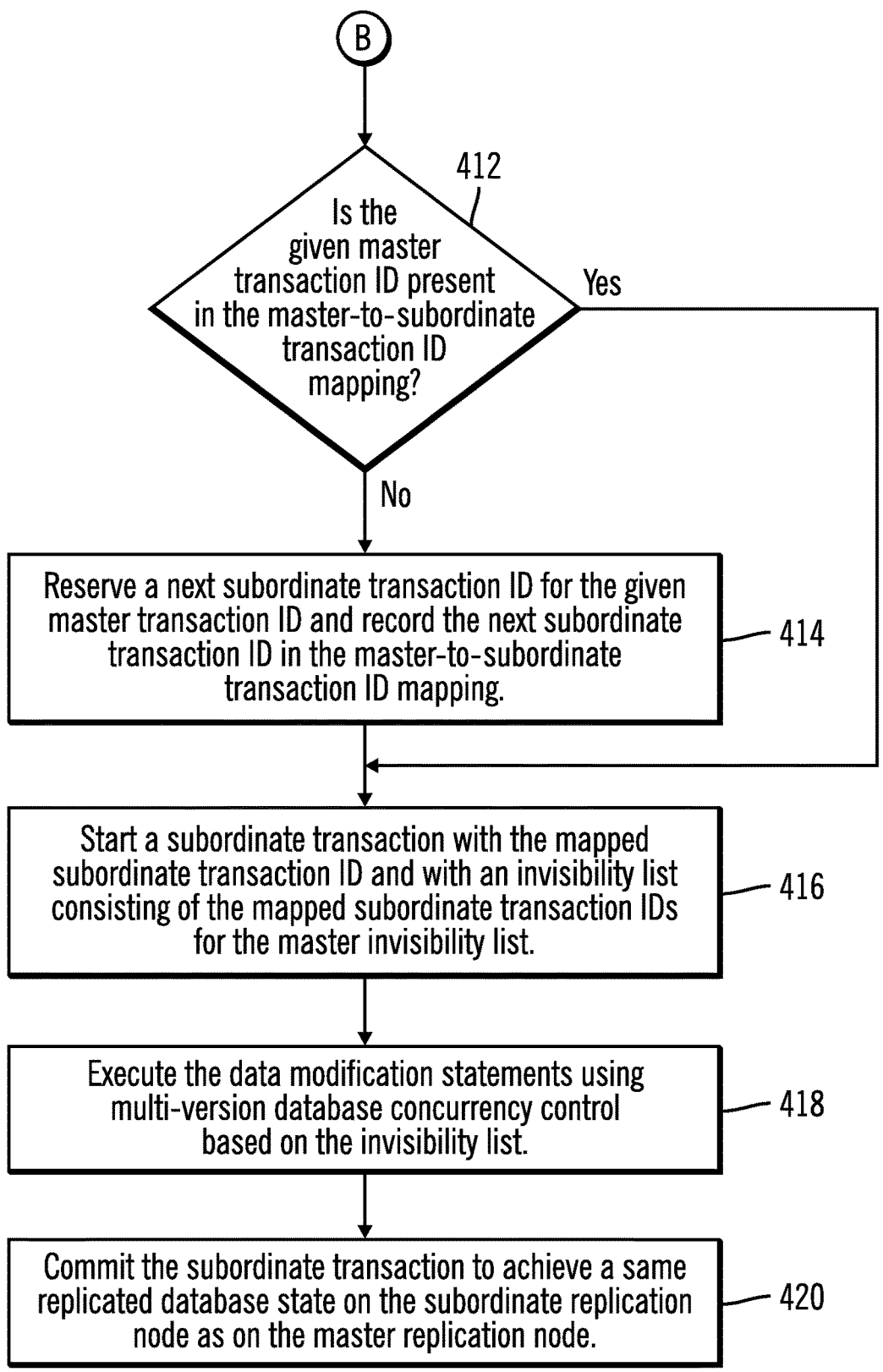

FIGS. 4A, 4B, and 4C illustrate, in a flowchart, processing performed by a subordinate replication node in accordance with certain embodiments. The processing of FIGS. 4A, 4B, and 4C are for one transaction, but this processing may be repeated serially for any number of transactions. Control begins at block 400 (FIG. 4A) with the statement-based data replicator 120b . . . 120n at a subordinate replication node 100b . . . 100n receiving a transaction start message, replicated data modification statements (that were executed on the master replication node), and a transaction commit message for a next committed transaction from a master replication node 100a, wherein the transaction start message carries a master transaction identifier (Mn), an invisibility list (InvisList(Mn)) consisting of transaction identifiers of other master transactions that had started and not yet committed when this master transaction started, and an earliest invisible master transaction ID EarliestInvis(Mn). In block 402, the statement-based data replicator 120b . . . 120n at the subordinate replication node 100b . . . 100n determines whether an earliest invisible master transaction ID is present in a master-to-subordinate transaction ID mapping. If so, processing continues to block 406 (FIG. 4B), otherwise, processing continues to block 404. In block 404, the statement-based data replicator 120b . . . 120n at the subordinate replication node 100b . . . 100n reserves a next subordinate transaction ID for the earliest invisible master transaction ID and records the next subordinate transaction ID in the master-to-subordinate transaction ID mapping. From block 404 (FIG. 4A), processing continues to block 406 (FIG. 4B).

In block 406, the statement-based data replicator 120b . . . 120n at the subordinate replication node 100b . . . 100n determines whether there are any more transaction IDs in the master invisibility list. If not, processing continues to block 412 (FIG. 4C), otherwise, processing continues to block 408. In block 408, the statement-based data replicator 120b . . . 120n at the subordinate replication node 100b . . . 100n determines whether a next-highest invisible master transaction ID is present in the master-to-subordinate transaction ID mapping. If so, processing continues to block 406, otherwise, processing continues to block 410. In block 410, the statement-based data replicator 120b . . . 120n at the subordinate replication node 100b . . . 100n reserves a next subordinate transaction ID for the next invisible master transaction ID and records the next subordinate transaction ID in the master-to-subordinate transaction ID mapping. From block 410, processing continues to block 406.

In block 412 (FIG. 4C), the statement-based data replicator 120b . . . 120n at the subordinate replication node 100b . . . 100n determines whether the given master transaction ID is present in the master-to-subordinate transaction ID mapping. If so, processing continues to block 416, otherwise, processing continues to block 414. In block 414, the statement-based data replicator 120b . . . 120n at the subordinate replication node 100b . . . 100n reserves a next subordinate transaction ID for the given master transaction ID and records the next subordinate transaction ID in the master-to-subordinate transaction ID mapping.

In block 416, the statement-based data replicator 120b . . . 120n at the subordinate replication node 100b . . . 100n starts a subordinate transaction with the mapped subordinate transaction ID and with an invisibility list consisting of the mapped subordinate transaction IDs for the master invisibility list. In block 418, the statement-based data replicator 120b . . . 120n at the subordinate replication node 100b . . . 100n executes the data modification statements using multi-version database concurrency control based on the invisibility list. The construction of the subordinate transaction's invisibility list ensures that the subordinate transaction will see the same snapshot of replicated data that the master (original) transaction saw on the master replication node 100a. In block 420, the statement-based data replicator 120b . . . 120n at the subordinate replication node 100b . . . 100n commits the subordinate transaction to achieve a same replicated database state on the subordinate replication node as on the master replication node.

Reclamation/Garbage-Collection of Obsolete Database Records

In a multi-version database system, the storage space occupied by the database record versions in tables may grow without bound unless steps are taken to remove deleted database records that are obsolete and no longer needed. This process is variously referred to as reclaiming, pruning, grooming, or garbage-collection. Herein, the terms "reclamation" and "reclaim" will be used.

A deleted database record R, marked with a deletxid D, say, may be reclaimed when it is known that it will no longer be accessed by any transaction. Assume that the oldest unfinished transaction in the system has transaction ID O. If O<D, then O may potentially need to see the contents of R since the deletion of the latter is invisible to O. Furthermore, if O>D but D is on the invisibility list of O, then D is again invisible to O and O may potentially need to see R.

The above leads to the definition of stable transaction ID L, which defines a cutoff point such that database records marked for deletion by transactions with ID<L may be safely reclaimed. If O is the transaction ID of the oldest currently unfinished transaction, then L is either:

If O's invisibility list is empty, then O itself; or

If O's invisibility list is not empty, then the lowest transaction ID in O's invisibility list; or If there are no currently unfinished transactions, then the next transaction ID that would be assigned.

In the absence of statement-based replication with snapshot isolation, reclaiming deleted database records whose deletxid is <L is safe. It cannot lead to premature removal of deleted database records that may be needed, so long as transactions are always started in increasing transaction ID order (which means that no new transactions with transaction ID<O may appear). But, in certain embodiments, this is not the case on a subordinate replication node $100b \ldots 100n$, because there may be a delay between reserving a transaction ID and the arrival and execution of the corresponding transaction from the master.

Consider the transactions in the earlier example, in which M0<M1<M2 and they commit on the master in the order M0, M2, and M1. These replicated transactions arrive on the subordinate replication node $100b \ldots 100n$ for execution in that order, and get reserved transaction IDs S0, S2, and S1, respectively, where S0<S1<S2. Because M0 is on InvisList (M1) and S0 is on InvisList(S1), the execution of S1 on the subordinate replication node $100b \ldots 100n$ may need to see database records deleted by S0 in order to have the same effect on the replicated data as M1 did on the master replication node $100a$. Now assume that some user performs a reclamation operation on the subordinate while S2 is executing and before S1 arrives for execution. Because S1 is in InvisList(S2) but S0 is not (M0 committed on the master replication node $100a$ before M2 started), the stable transaction id L on the subordinate will be S1. Database records, if any, deleted by S0 will be prematurely reclaimed and may affect the subsequent execution of S1 in a way that leads to different effects on the subordinate replication node's $100b \ldots 100n$ copy of the replicated data than M1 did on the master replication node $100b \ldots 100n$. This is where the earliest invisible transaction ID comes into play.

To avoid the above problem, the stable transaction ID is defined to be more conservative as follows. Let Sj be the (subordinate) transaction ID of the last replicated transaction, with corresponding master transaction ID Mj, that was executed on the subordinate replication node $100b \ldots 100n$. Subsequent replicated transactions executed on the subordinate replication node $100b \ldots 100n$ will generally have transaction ID>Sj (and master transaction ID>Mj), but if some replicated transaction Mi<Mj had not committed on the master replication node $100a$ at the time Mj committed, then the corresponding Si<Sj will be executed on the subordinate replication node $100b \ldots 100n$ after Sj. This may be the case if Mi was on the invisibility list of Mj (any other replicated transaction on the master with transaction ID<Mj that is not in InvisList(Mj) would have committed), which means that Si would be on the invisibility list of Sj. Further, when Si is executed on the subordinate, Si may need to see database records deleted by transactions on its invisibility list (which may or may not be on InvisList(Sj)).

Based on the above, the definition of stable transaction ID above is extended to take the smallest of the following:

The original, non-replicated definition of stable transaction ID L, from above.

If Sj, the ID of last replicated transaction executed, has any transaction IDs on its invisibility list, then the smallest of these.

If Sj has any transaction IDs on its invisibility list and any of these have transaction IDs on their invisibility lists, then the smallest of the transaction IDs on those transactions' invisibility lists.

Based on this, the stable transaction id at the subordinate when S2 is executed will be S0 (because EarliestInvis(M2)= M0), so if a reclaim operation is performed, records deleted by S0, which may be needed later when S1 is executed, will not be prematurely reclaimed.

The capturing, and transmission by the statement-based data replicator $120b \ldots 120n$ to subordinate replication nodes $100b \ldots 100n$, of the earliest invisible transaction ID for each master replicated transaction Mj allows the statement-based data replicator $120b \ldots 120n$ at the subordinate replication nodes $100b \ldots 100n$ to compute a correct stable transaction ID even when the invisibility lists of transactions in InvisList(Sj) are not yet known, as is the case with S1 in InvisList(S2) above.

Reclamation/Garbage-Collection of Obsolete Transaction Id Mapping Database Records Following similar logic, reserved transaction ID mappings on a subordinate replication node $100b \ldots 100n$ may be reclaimed and discarded as follows. The earliest invisible id, EarliestInvis(M), of a replicated master transaction M indicates that no replicated transactions with ID<EarliestInvis(M) will ever arrive at a subordinate replication node $100b \ldots 100n$ after M: Any such transactions would either have committed before M (in which case it has already arrived at and been executed by the subordinate replication node $100b \ldots 100n$) or would have rolled back or not have been a replicated transaction (in either of the last two cases, the transaction does not leave the master replication node $100a$). Therefore, after execution of a replicated master transaction M on a subordinate replication node $100b \ldots 100n$, reserved transaction ID mappings for master transactions<EarliestInvis(M) are no longer needed and may be discarded. In the example above, the mapping <M0, S0> cannot be discarded after execution of S0, S2, or S1 (because each of these has an earliest-invisible transaction ID of S0), but only after execution of a subsequent master replicated transaction that has an earliest invisible transaction ID>M0.

Parallel Transaction Execution

In certain embodiments, parallel execution of replicated transactions is permitted on a subordinate replication node $100b \ldots 100n$ when the effect is the same as strict serial execution of the transactions, with appropriate invisibility lists for snapshot isolation, in the order they committed on the master replication node $100a$. Parallel execution is permitted, and will produce the same results as serial execution in master commit order, if the following constraints are obeyed (they are by construction obeyed in the serial execution approach presented above):

1. For master transactions M1 and M2 that committed in that order, the corresponding subordinate transactions S1 and S2, respectively, cannot execute in parallel if M1 committed on the master before M2 started (on the master) and M1 writes (creates, alters the definition of, drops, or inserts, deletes, or updates database records) data that M2 reads. This constitutes a "Write-Read" dependency between the transactions. If S1 were not required to commit on a subordinate before S2 starts, S2 could see different data (not yet modified and committed by S1) from what M2 saw on the master, and its execution could yield different results and cause the replicas to diverge.

2. If master transaction M1 committed before M2 started, then the corresponding subordinate transaction S1 must complete its reservation and mapping of transaction IDs (as illustrated in blocks 402 through 414 of FIGS. 4A, 4B, and 4C, and in block 504 of FIG. 5A) before the subordinate transaction S2 starts its reservation and mapping of transaction IDs. Since M1 is not in InvisList(M2), it is necessary that M1 have its subordinate transaction ID reserved first, to ensure the requirement that the subordinate transaction ID reservation order match the master transaction ID assignment order. Furthermore, suppose there was a master transaction Mi that started before M2 started but did not commit before M2 started. This constraint does not require that the corresponding subordinate transaction S1 perform its transaction ID reservation and mapping before S2 does. Since Mi is on M2's invisibility list, if S2 gets to perform its reservation and mapping before S1 does (which may or may not actually happen in some embodiments), it will correctly reserve S1 before S2 in the proper order.

3. If master transaction M1 committed before M2 committed, the corresponding subordinate transactions S1 and S2, respectively, must also commit in that order. By disallowing "gaps" in the commit order on the subordinate, this ensures that the above garbage-collection method continues to work correctly, and that a query against the database copy on a subordinate does not see the effects of M2 without also seeing the effects of M1 (a situation that could not have occurred on the master). Where this level of query consistency is not strictly required, some embodiments may relax this constraint and allow out-of-order transaction commit on a subordinate replication node.

We describe herein alternative embodiments of parallel transaction execution that obey the above constraints: a "pessimistic" embodiment, which only executes committed master transactions on a subordinate, and an "optimistic" embodiment, which can generally reduce latency but runs the risk of wasting subordinate resources on the execution of transactions that ultimately need to be rolled back.

Pessimistic Parallel Transaction Execution

Figure 5A:
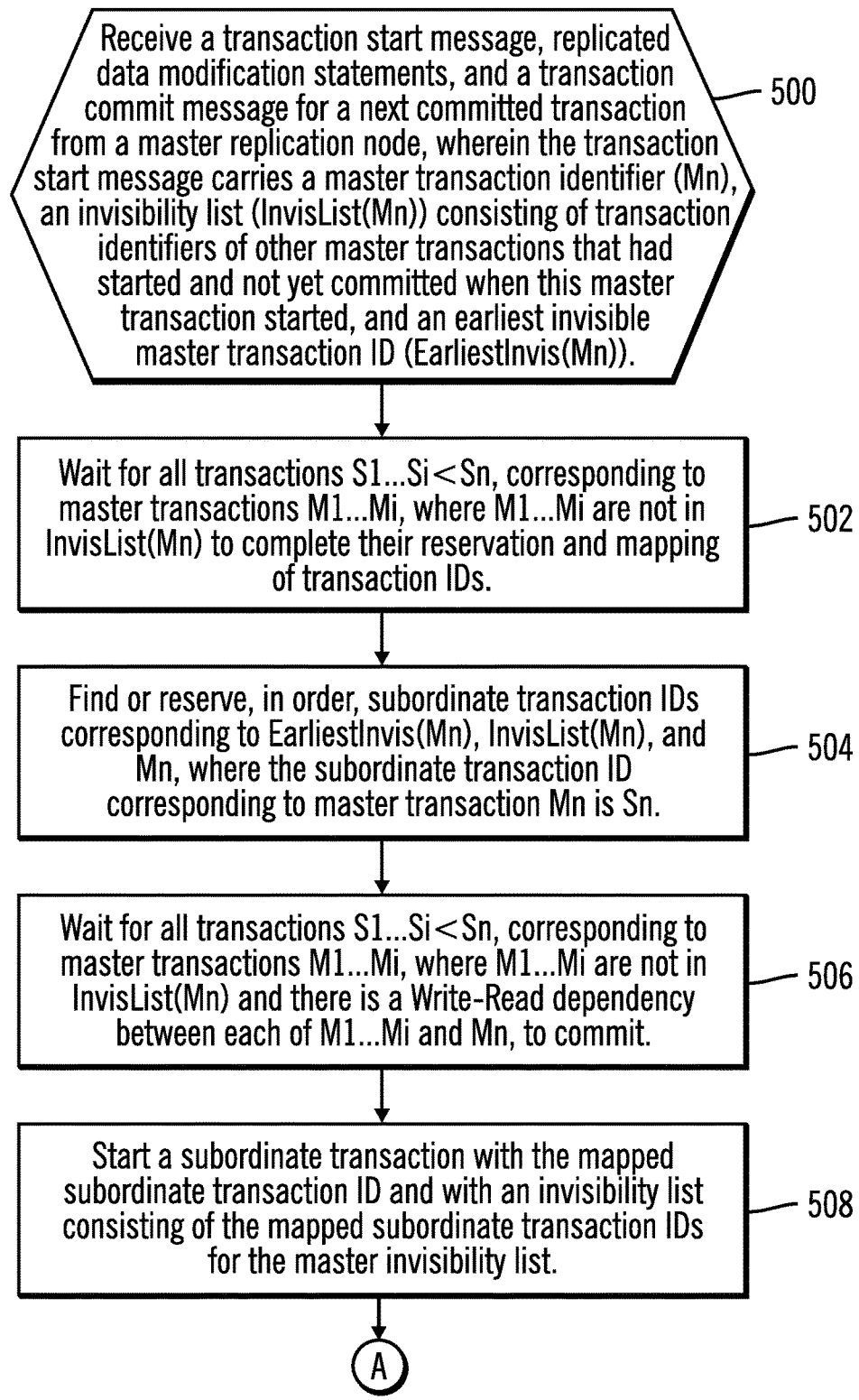
FIGS. 5A and 5B illustrate, in a flowchart, processing performed by a subordinate replication node for pessimistic parallel transaction execution in accordance with certain embodiments.
Figure 5B:
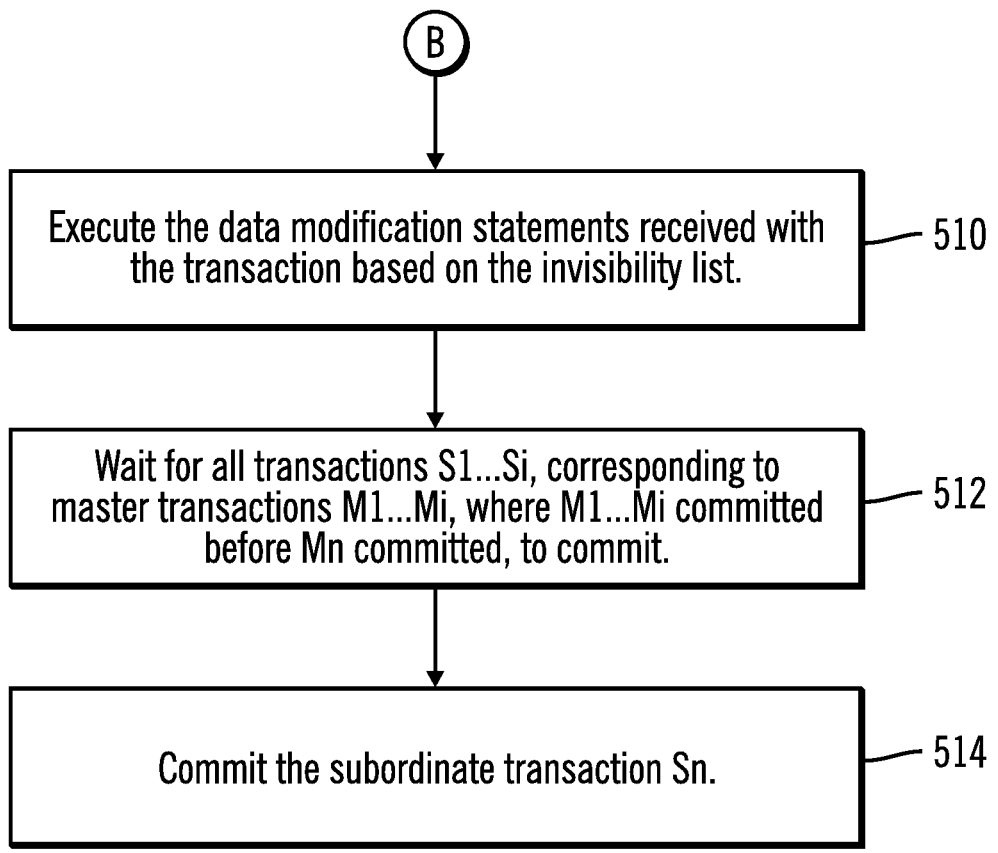

FIGS. 5A and 5B illustrate, in a flowchart, processing for pessimistic parallel transaction execution in accordance with certain embodiments. This processing may be repeated, possibly in parallel, for any number of transactions. Control begins at block 500 with the statement-based data replicator 120b . . . 120n at a subordinate replication node 100b . . . 100n receiving a transaction start message, replicated data modification statements (that were executed on the master replication node), and a transaction commit message for a next committed transaction from a master replication node 100a, wherein the transaction start message carries a master transaction identifier (Mn), an invisibility list (InvisList (Mn)) consisting of transaction identifiers of other master transactions that had started and not yet committed when this master transaction started, and an earliest invisible master transaction ID EarliestInvis(Mn). In block 502, the statement-based data replicator 120b . . . 120n at a subordinate replication node 100b . . . 100n waits for all transactions S1 . . . Si<Sn, corresponding to master transactions M1 . . . Mi, where M1 . . . Mi are not in InvisList(Mn) (and therefore each committed on the master replication node 100a before Mn started) to complete their reservation and mapping of transaction IDs (i.e., complete block 504 in their processing of this flowchart).

In block 504, which summarizes and encapsulates blocks 402 through 414 in FIGS. 4A, 4B, and 4C, the statement-based data replicator 120b . . . 120n at a subordinate replication node 100b . . . 100n finds or reserves, in order, subordinate transaction IDs corresponding to EarliestInvis (Mn), InvisList(Mn), and Mn, where the subordinate transaction ID corresponding to master transaction Mn is Sn. In block 506, the statement-based data replicator 120b . . . 120n at a subordinate replication node 100b . . . 100n waits for all transactions S1 . . . Si<Sn, corresponding to master transactions M1 . . . Mi, where M1 . . . Mi are not in InvisList (Mn) and there is a Write-Read dependency between each of M1 . . . Mi and Mn (that is, each wrote or modified data that was read by Mn), to commit (that is, complete block 514 in its processing of this flowchart).

In block 508, the statement-based data replicator 120b . . . 120n at a subordinate replication node 100b . . . 100n starts a subordinate transaction with the mapped subordinate transaction ID and with invisibility list consisting of the mapped subordinate transaction IDs for the master invisibility list. From block 508 (FIG. 5A), processing continues to block 510 (FIG. 5B).

In block 510, the statement-based data replicator 120b . . . 120n at a subordinate replication node 100b . . . 100n executes the data modification statements received with the transaction. The construction of the subordinate transaction's invisibility list ensures that the subordinate transaction will see the same snapshot of replicated data that the master (original) transaction saw on the master.

In block 512, the statement-based data replicator 120b . . . 120n at a subordinate replication node 100b . . . 100n waits for all transactions S1 . . . Si, corresponding to master transactions M1 . . . Mi, where M1 . . . Mi committed before Mn committed, to commit. In block 514, the statement-based data replicator 120b . . . 120n at a subordinate replication node 100b . . . 100n commits the subordinate transaction Sn.

Consider a replicated database with data items X, Y, and Z, and the following master transactions:

$$Y=X+2; \qquad M1:$$

$$Z=Y+2; \qquad M2:$$

Suppose M1 committed on the master before M2 started; this results in a Write-Read dependency between M1 and M2. The corresponding subordinate transactions S1 and S2, respectively, must execute strictly in order (i.e., S1 also commits before S2 starts), so that S2 sees S1's change to Y and the end result of executing S1 and S2 on the subordinate is the same as the execution of M1 and M2 on the master.

Note that if M1 did not commit on the master before M2 started, then parallel execution of S1 and S2 on the subordinate is permitted (but not required). In this case, there would be a "Read-Write" dependency between M2 and M1, in that M2 reads data that M1 writes but M2 does not see M1's write. The mapped transaction IDs and invisibility lists will ensure that S2 does not see S1's changes and will therefore produce the same effects on the subordinate as on the master. Thus, the use of multi-version data and transaction invisibility lists allows greater concurrency of transaction execution on subordinate replication nodes than an approach that does not use multiple versions (where S2 would have to commit on the subordinate replication node 100b . . . 100n before S1 starts and modifies Y).

Optimistic Parallel Transaction Execution

In optimistic parallel transaction execution, a subordinate replication node may choose to apply idle computing resources to executing replicated transactions that are not yet known to have committed on the master (subject to certain constraints as enumerated above). Such a subordinate transaction will not be allowed to commit until the master transaction commits, and will need to be rolled back if the master transaction rolls back. When a subordinate replication node has a choice of applying limited computing resources to executing a master transaction that is known to have committed (see the transaction commit message below) versus optimistically executing a master transaction not yet known to have committed or rolled back, some embodiments will favor the former because it is known that execution of such transactions will not be rolled back and resources will not have been wasted.

To support optimistic parallel transaction execution, embodiments extend the framework introduced above by sending the various messages from a master replicated transaction to subordinate replication nodes as the transaction progresses rather than all at once when the master transaction commits. In addition, the master replication node will send a transaction rollback message in the case where the replicated transaction does not commit on the master but instead rolls back.

Figure 6A:
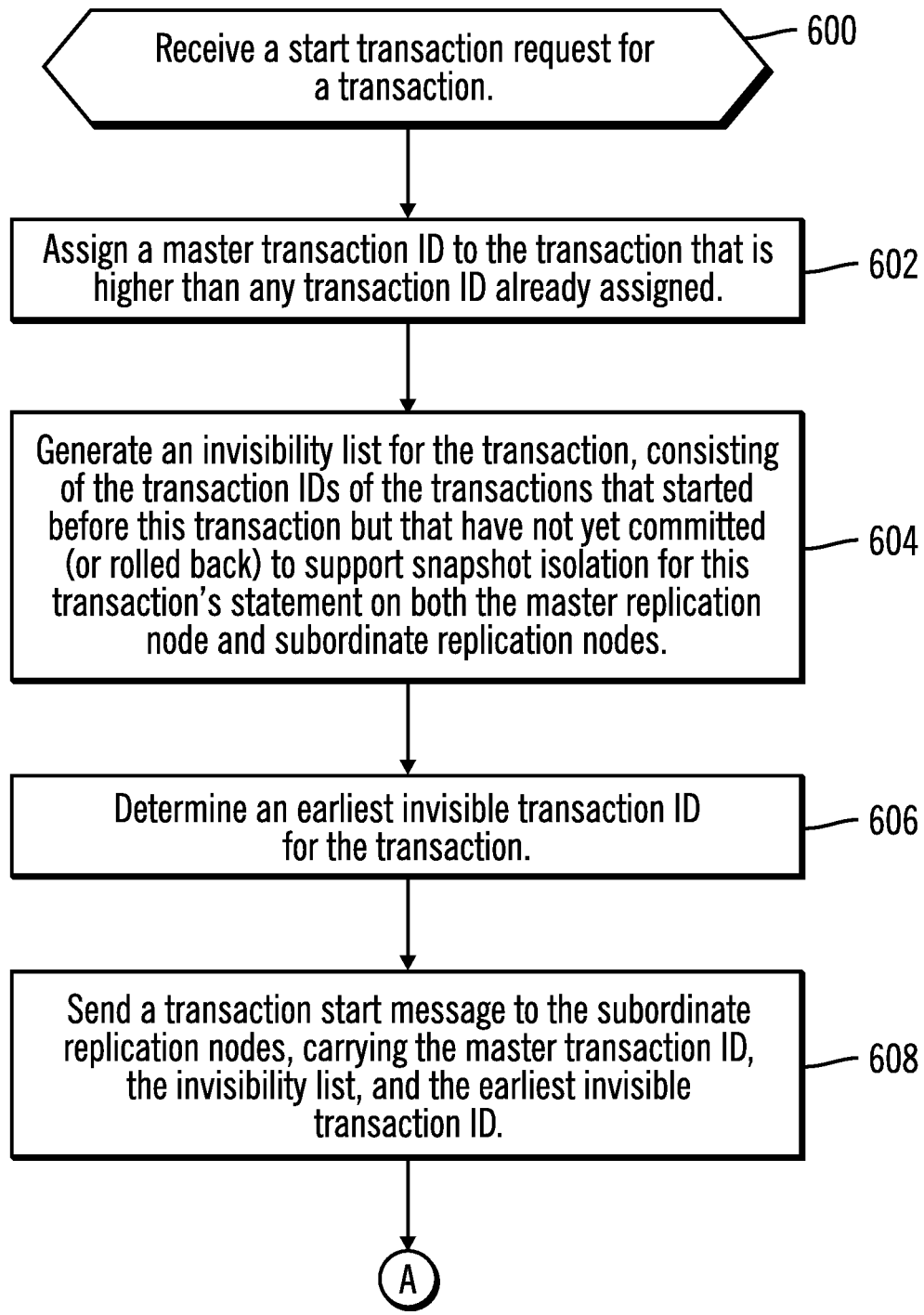
FIGS. 6A and 6B illustrate, in a flowchart, processing performed by a master replication node for optimistic parallel transaction execution in accordance with certain embodiments.
Figure 6B:
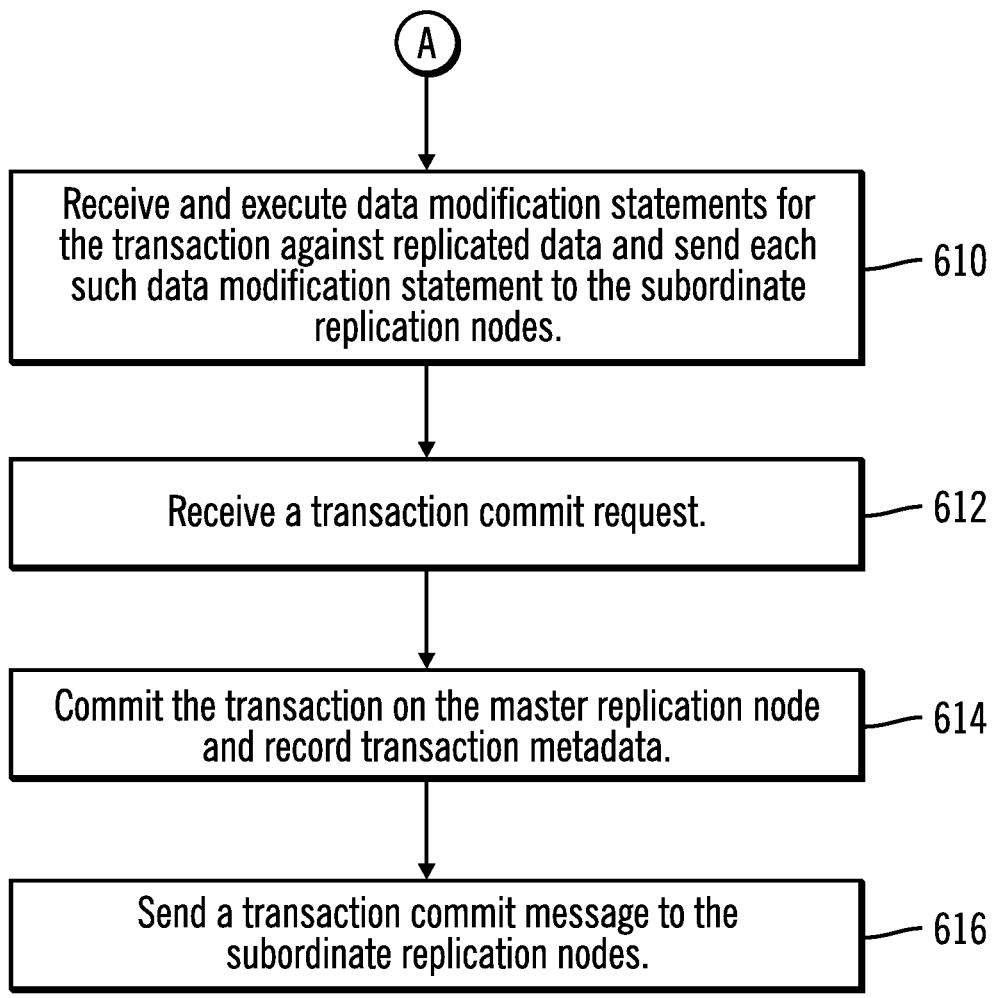

FIGS. 6A and 6B illustrate, in a flowchart, processing performed by a master replication node for optimistic parallel transaction execution in accordance with certain embodiments. In certain embodiments, master replicated transaction processing follows the flow diagram in FIGS. 6A and 6B, which are extensions of FIGS. 3A and 3B incorporating messages sent at different stages from master to subordinate replication nodes. The processing of FIGS. 6A and 6B is for one transaction, but this processing may be repeated, possibly in parallel, for any number of transactions. Control begins at block 600 (FIG. 6A) with the statement-based data replicator 120a at the master replication node 100a receiving a start transaction request for a transaction. In block 602, the statement-based data replicator 120a at the master replication node 100a assigns a master transaction ID to the transaction that is higher than any transaction ID already assigned. In block 604, the statement-based data replicator 120a at the master replication node 100a generates an invisibility list for the transaction, consisting of the transaction IDs of the transactions that started before this transaction but that have not yet committed (or rolled back) to support snapshot isolation for this transaction's statements on both the master replication node and subordinate replication nodes. In block 606, the statement-based data replicator 120a at the master replication node 100a determines an earliest invisible transaction ID for the transaction.

In block 608, the statement-based data replicator 120a at the master replication node 100a sends a transaction start message to the subordinate replication nodes, carrying the master transaction ID, the invisibility list, and the earliest invisible transaction ID. This message is sent no sooner than the sending of transaction commit messages of replicated transactions that committed before this transaction started. This ensures that the subordinate replication node 100b . . . 100n is able to determine which master transactions committed before this master transaction started.

In block 610, the statement-based data replicator 120a at the master replication node 100a receives and executes data modification statements for the transaction against replicated data and sends each such data modification statement to the subordinate replication nodes. For each such statement received, the statement-based data replicator 120a at the master replication node 100a sends the statement to the subordinate replication nodes before, during, or after (reflecting different possible levels of "optimism" that may be employed in different embodiments) execution of the statement on the master replication node 100a.

In block 612, the statement-based data replicator 120a at the master replication node 100a receives a transaction commit request. In block 614, the statement-based data replicator 120a at the master replication node 100a commits the transaction on the master replication node 100a and records transaction metadata. In block 616, the statement-based data replicator 120a at the master replication node 100a sends a transaction commit message to the subordinate replication nodes. This message is sent no sooner than the sending of Transaction Commit messages of previously-committed replicated transactions, ensuring that the subordinate replication nodes, even with optimistic transaction execution, are able to observe the commit order of replication transactions on the master replication node.

FIGS. 6A and 6B do not show, for simplicity, rollback processing of a replicated transaction on a master replication node. If a replicated transaction on the master replication node 100a rolls back, in response to either a user directive or a system or execution failure, the statement-based data replicator 120a at the master replication node 100a transmits a transaction rollback message to the subordinate replication nodes.

Figure 7A:
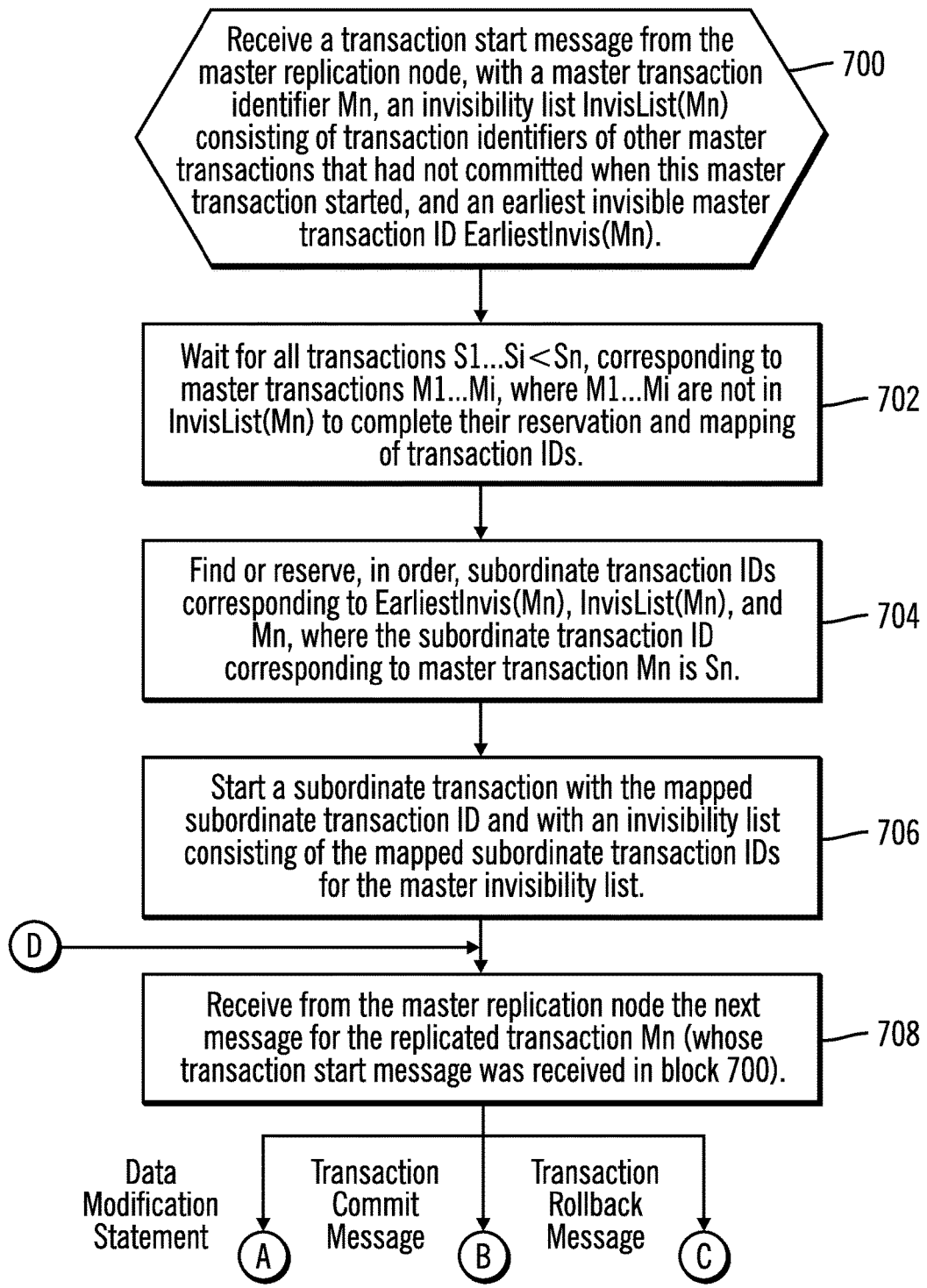
FIGS. 7A, 7B, 7C, and 7D illustrate, in a flowchart, processing performed by a subordinate replication node for optimistic parallel transaction execution in accordance with certain embodiments.
Figure 7B:
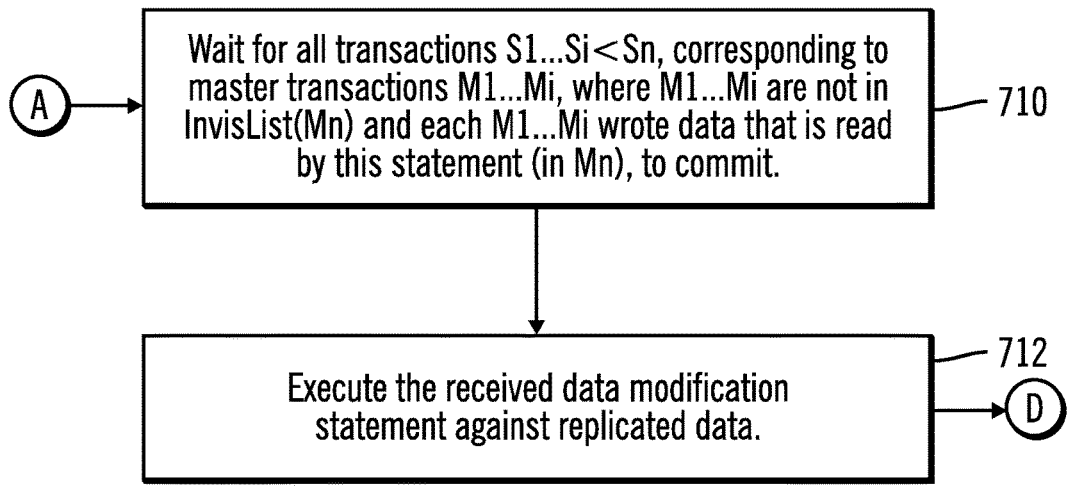
Figure 7C:
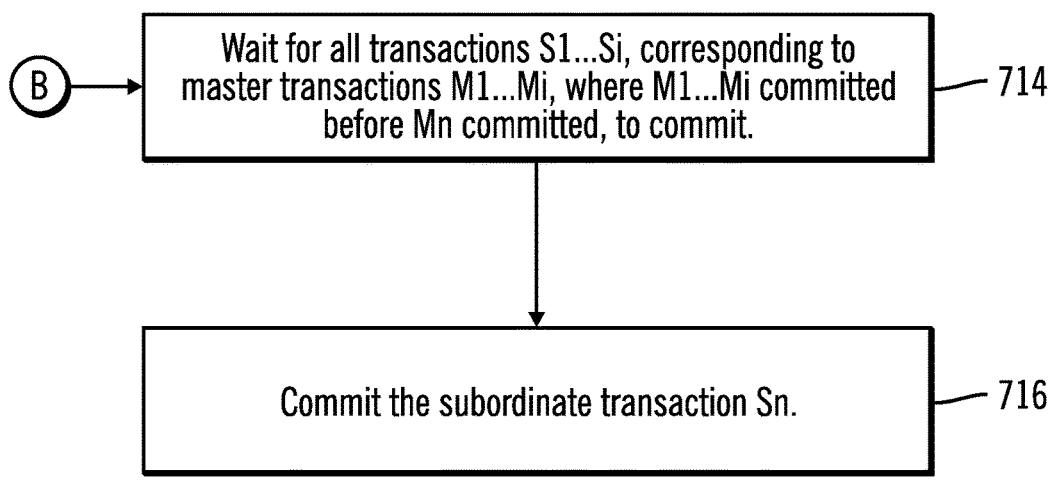

FIGS. 7A, 7B, 7C, and 7D illustrate, in a flowchart, processing performed by a subordinate replication node for optimistic parallel transaction execution in accordance with certain embodiments. In certain embodiments, subordinate replicated transaction processing supporting optimistic parallel transaction execution follows the flow diagram in FIGS. 7A and 7B, which are an extension of FIGS. 5A and 5B incorporating additional steps where processing may need to wait for the commits of certain other subordinate transactions executing in parallel. The processing of FIGS. 7A and 7B is for one transaction, but this processing may be repeated, possibly in parallel, for any number of transactions. Control begins at block 700 (FIG. 7A) with the statement-based data replicator 120a at the subordinate replication node 100b . . . 100n receiving a transaction start message from the master replication node 100a, with a master transaction identifier Mn, an invisibility list InvisList (Mn) consisting of transaction identifiers of other master transactions that had not committed when this master transaction started, and an earliest invisible master transaction ID EarliestInvis(Mn). In block 702, the statement-based data replicator 120b . . . 120n at a subordinate replication node 100b . . . 100n waits for all transactions S1 . . . Si<Sn, corresponding to master transactions M1 . . . Mi, where M1 . . . Mi are not in InvisList(Mn) (and therefore each committed on the master before Mn started) to complete their reservation and mapping of transaction IDs (i.e., complete block 704 in their processing of this flow chart).

In block 704, the statement-based data replicator 120b . . . 120n at a subordinate replication node 100b . . . 100n finds or reserves, in order, subordinate transaction IDs corresponding to EarliestInvis(Mn), InvisList(Mn), and Mn, where the subordinate transaction ID corresponding to master transaction Mn is Sn. In block 706, the statement-based data replicator 120b . . . 120n at a subordinate replication node 100b . . . 100n starts a subordinate transaction with the mapped subordinate transaction ID and with an invisibility list consisting of the mapped subordinate transaction IDs for the master invisibility list.

Figure 7D:
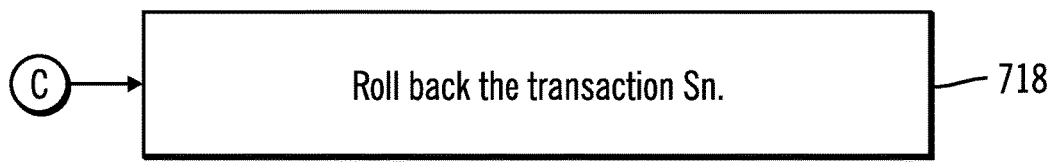

In block 708, the statement-based data replicator 120b . . . 120n at a subordinate replication node 100b . . . 100n receives from the master replication node 100a the next message for the replicated transaction Mn (whose transaction start message was received in block 700). If this message is a replicated data modification statement, processing continues to block 710 (FIG. 7B); if this message is a transaction commit message, processing continues to block 714 (FIG. 7C); if this message is a transaction rollback message, processing continues to block 718 (FIG. 7D).

In block 710, the statement-based data replicator 120b . . . 120n at a subordinate replication node 100b . . . 100n waits for all transactions S1 . . . Si<Sn, corresponding to master transactions M1 . . . Mi, where M1 . . . Mi are not in InvisList(Mn) and each M1 . . . Mi wrote data that is read by this data modification statement (in Mn), to commit (that is, complete block 714 in its processing of this flowchart). In block 712, the statement-based data replicator 120b . . . 120n at a subordinate replication node 100b . . . 100n executes the received data modification statement against replicated data. The construction of the subordinate transaction's invisibility list ensures that the subordinate transaction will see the same snapshot of replicated data that the master (original) transaction saw on the master. Processing for this transaction continues to block 708 (FIG. 7A).

In block 714 (entered on receipt of a transaction commit message for this transaction), the statement-based data replicator 120b . . . 120n at a subordinate replication node 100b . . . 100n waits for all transactions S1 . . . Si, corresponding to master transactions M1 . . . Mi, where M1 . . . Mi committed before Mn committed, to commit. In block 716, the statement-based data replicator 120b . . . 120n at a subordinate replication node 100b . . . 100n commits the transaction Sn, and processing in this flow diagram stops for this transaction.

In block 718 (entered on receipt of a transaction rollback message for this transaction), the statement-based data replicator 120b . . . 120n at a subordinate replication node 100b . . . 100n rolls back the transaction Sn, and processing in this flow diagram stops for this transaction.

Conclusion

Thus, the statement-based data replicator 120a . . . 120n addresses the limitations imposed by the serializability constraint. The statement-based data replicator 120a . . . 120n preserves the benefits of statement-based data replication, without requiring transaction serializability. The statement-based data replicator 120a . . . 120n replicates, for each transaction, the same replicated database state at each replication node, using a multi-version database concurrency control technique. The statement-based data replicator 120a . . . 120n provides for the replication of the transaction metadata necessary to support snapshot isolation on the replicas based on the master replication node's transaction environment (the source system transaction environment).

With the statement-based data replicator 120a . . . 120n, instead of transaction serializability, snapshot isolation is provided, in which a transaction sees a consistent database state reflecting just those other transactions that committed before the transaction started. Also, concurrent transactions cannot delete or update the same database records. Also, the statement-based data replicator 120a . . . 120n uses transaction invisibility lists, such that a database change by transaction Tx is visible to transaction Ty if Tx<Ty and Tx is not in the invisibility list of transaction Ty; otherwise the transaction Tx is not visible to transaction Tx.

When transmitting a replicated transaction from a master replication node to a subordinate replication node, the statement-based data replicator 120a includes the master transaction ID, invisibility list, and an earliest invisible transaction ID. The statement-based data replicator 120b . . . 120n maps these to subordinate transaction IDs when the incoming replicated transaction is received. The statement-based data replicator 120a . . . 120n preserves the master transaction ID order in the mapped subordinate transaction IDs, which may not be seen by the subordinate replication node in order. Also, the statement-based data replicator 120a . . . 120n takes into account transaction ID mappings when reclaiming deleted database records. Moreover, the statement-based data replicator 120a . . . 120n allows parallel execution of replicated transactions on a subordinate replication node, except when an earlier master transaction wrote data read by a later master transaction.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
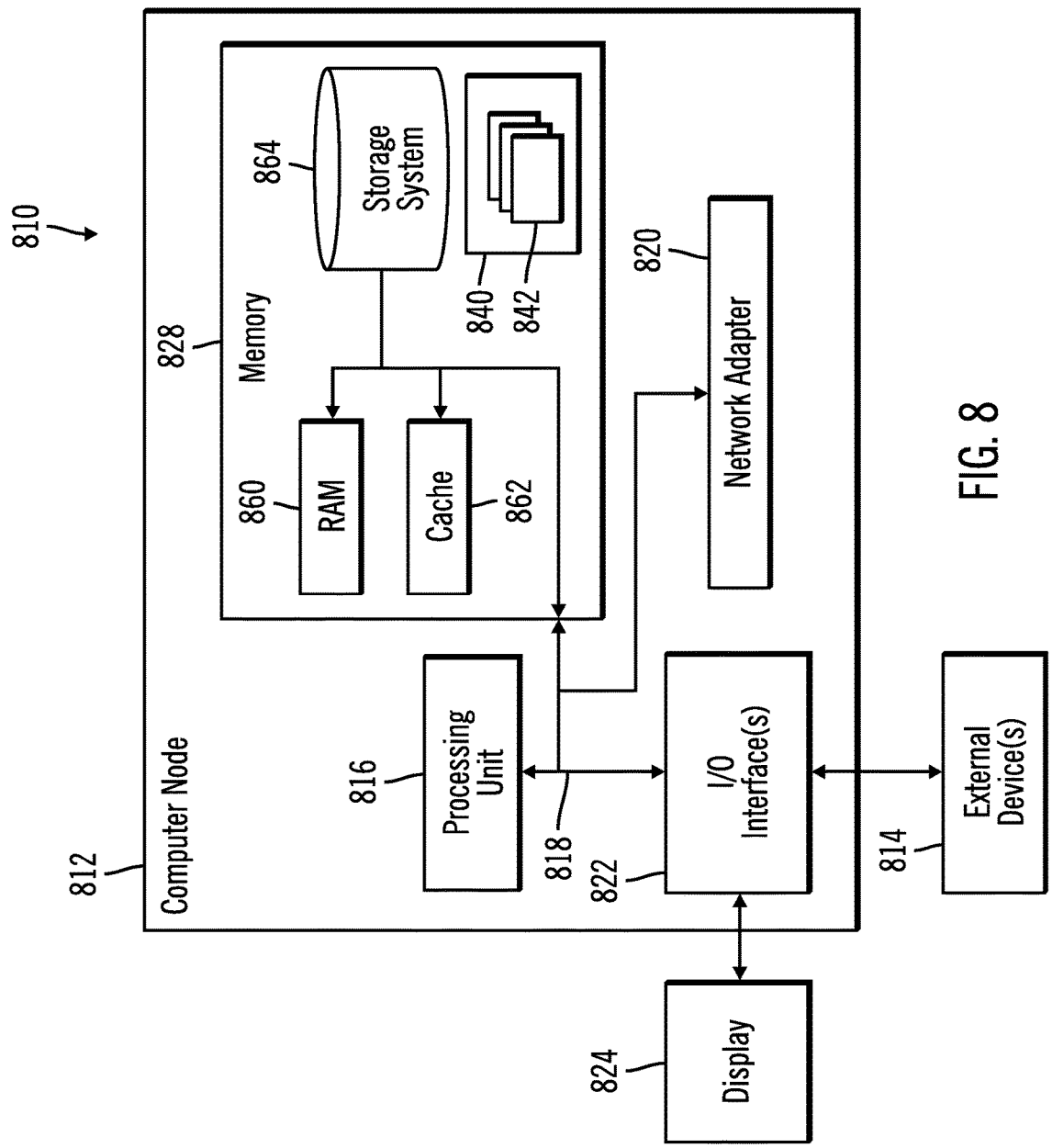
FIG. 8 illustrates a cloud computing node in accordance with certain embodiments.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
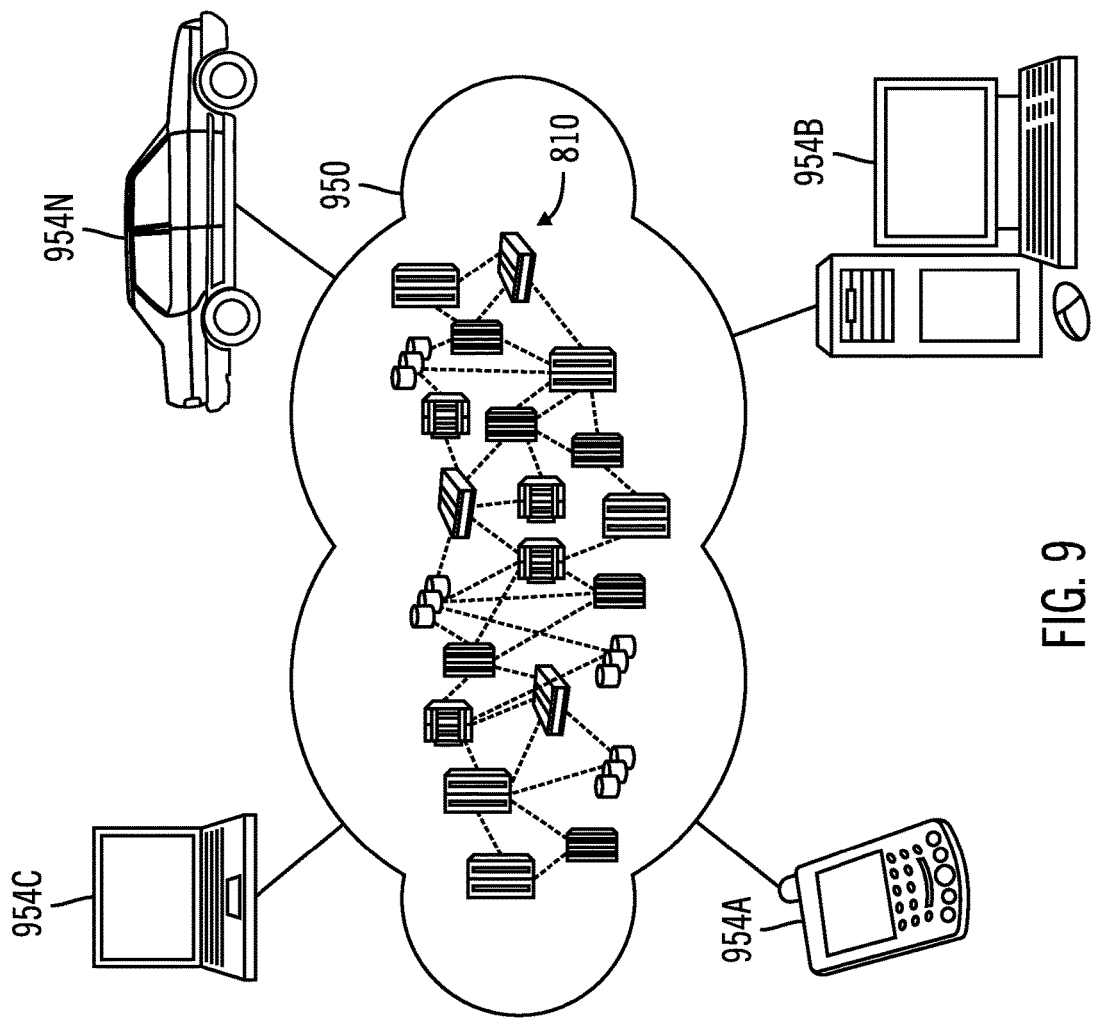
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 810 with which local computing devices used by cloud consumers, such as, for example, personal digital assistant (PDA) or cellular telephone 954A, desktop computer 954B, laptop computer 954C, and/or automobile computer system 954N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 810 and cloud computing environment 950 can communicate with any type of computerized device over any type of network and/or network addressable connection (e.g., using a web browser).

Figure 10:
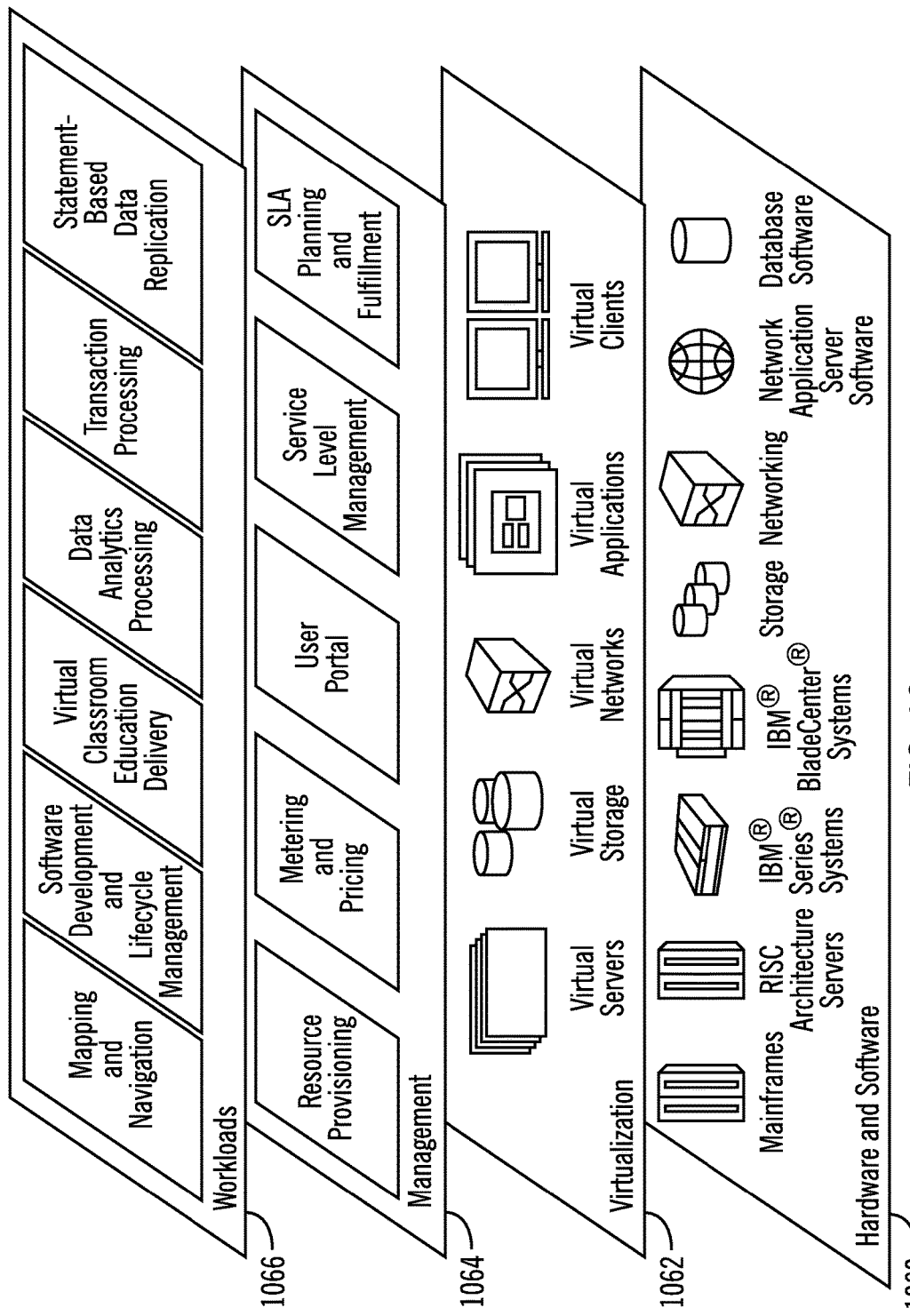
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and statement-based data replication.

Thus, in certain embodiments, software or a program, implementing statement-based data replication in accordance with embodiments described herein, is provided as a service in a cloud environment.

In certain embodiments, the master replication node 100$a$ and/or each subordinate replication node 100$b$ . . . 100$n$ has the architecture of computing node 810. In certain embodiments, the master replication node 100$a$ and/or each subordinate replication node 100$b$ . . . 100$n$ are part of a cloud environment. In certain alternative embodiments, the master replication node 100$a$ and/or each subordinate replication node 100$b$ . . . 100$n$ are not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    at a subordinate replication node, for one or more master transactions in parallel,
        storing a multi-version database, in which readers and writers do not block each other, that includes a column in each table to store a transaction identifier for each database record;
        receiving a transaction start message from a master replication node for a master transaction from the one or more master transactions, with a master transaction identifier, a master invisibility list, and an earliest invisible master transaction identifier, wherein the master invisibility list consists of transaction identifiers of other master transactions that had started before this master transaction and not yet committed when this master transaction started;
        performing one of finding and reserving, in order, for subordinate transactions corresponding to the master transactions, a subordinate transaction identifier for the earliest invisible master transaction identifier, subordinate transaction identifiers on a subordinate invisibility list for the transaction identifiers on the master invisibility list, and another subordinate transaction identifier for the master transaction identifier, wherein the subordinate transactions commit on the subordinate replication node in a same order as on the master replication node;
        starting a subordinate transaction with a subordinate transaction identifier, wherein the subordinate transaction does not see database records of the subordinate transaction identifiers on the subordinate invisibility list;
        receiving from the master replication node a next message for a replicated transaction; and
        in response to the next message comprising a data modification statement for the master transaction, waiting for the subordinate transactions corresponding to the master transactions that had started before this master transaction, that had committed before this master transaction started, and that wrote data that is read by this data modification statement to commit; and executing the data modification statement against replicated data on the subordinate replication node using multi-version database concurrency control based on the subordinate invisibility list.

2. The method of claim 1, further comprising:
in response to the next message comprising a transaction commit message for the master transaction,
waiting for the subordinate transactions corresponding to master transactions that committed before this master transaction committed, to commit; and
committing the subordinate transaction to achieve a same replicated database state on the subordinate replication node as on the master replication node.

3. The method of claim 1, further comprising:
in response to the next message comprising a transaction rollback message for the master transaction, rolling back the subordinate transaction.

4. A computer program product, the computer program product comprising a computer readable storage medium having program code embodied therewith, the program code executable by at least one processor to perform:
at a subordinate replication node, for one or more master transactions in parallel,
storing a multi-version database, in which readers and writers do not block each other, that includes a column in each table to store a transaction identifier for each database record;
receiving, by the at least one processor, a transaction start message from a master replication node for a master transaction from the one or more master transactions, with a master transaction identifier, a master invisibility list, and an earliest invisible master transaction identifier, wherein the master invisibility list consists of transaction identifiers of other master transactions that had started before this master transaction and not yet committed when this master transaction started;
performing, by the at least one processor, one of finding and reserving, in order, for subordinate transactions corresponding to the master transactions, a subordinate transaction identifier for the earliest invisible master transaction identifier, subordinate transaction identifiers for the transaction identifiers on the master invisibility list, and another subordinate transaction identifier for the master transaction identifier, wherein the subordinate transactions commit on the subordinate replication node in a same order as on the master replication node;
starting, by the at least one processor, a subordinate transaction with a subordinate transaction identifier, wherein the subordinate transaction does not see database records of the subordinate transaction identifiers of the subordinate invisibility list;
receiving, by the at least one processor, from the master replication node a next message for a replicated transaction; and
in response to the next message comprising a data modification statement for the master transaction, waiting, by the at least one processor, for the subordinate transactions corresponding to the master transactions that had started before this master transaction, that had committed before this master transaction started, and that wrote data that is read by this data modification statement to commit; and
executing, by the at least one processor, the data modification statement against replicated data on the subordinate replication node using multi-version database concurrency control based on the subordinate invisibility list.

5. The computer program product of claim 4, wherein the program code is executable by the at least one processor to perform:
in response to the next message comprising a transaction commit message for the master transaction,
waiting, by the at least one processor, for the subordinate transactions corresponding to master transactions that committed before this master transaction committed, to commit; and
committing, by the at least one processor, the subordinate transaction to achieve a same replicated database state on the subordinate replication node as on the master replication node.

6. The computer program product of claim 4, wherein the program code is executable by the at least one processor to perform:
in response to the next message comprising a transaction rollback message for the master transaction, rolling, by the at least one processor, back the subordinate transaction.

7. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
at a subordinate replication node, for one or more master transactions in parallel,
storing a multi-version database, in which readers and writers do not block each other, that includes a column in each table to store a transaction identifier for each database record;
receiving a transaction start message from a master replication node for a master transaction from the one or more master transactions, with a master transaction identifier, a master invisibility list, and an earliest invisible master transaction identifier, wherein the master invisibility list consists of transaction identifiers of other master transactions that had started before this master transaction and not yet committed when this master transaction started;
performing one of finding and reserving, in order, for subordinate transactions corresponding to the master transactions, a subordinate transaction identifier for the earliest invisible master transaction identifier, subordinate transaction identifiers for the transaction identifiers on the master invisibility list, and another subordinate transaction identifier for the master transaction identifier, wherein the subordinate transactions commit on the subordinate replication node in a same order as on the master replication node;
starting a subordinate transaction with a subordinate transaction identifier, wherein the subordinate transaction does not see database records of the subordinate transaction identifiers of the subordinate invisibility list;

receiving from the master replication node a next message for a replicated transaction; and in response to the next message comprising a data modification statement for the master transaction, waiting for the subordinate transactions corresponding to the master transactions that had started before this master transaction, that had committed before this master transaction started, and that wrote data that is read by this data modification statement to commit; and executing the data modification statement against replicated data on the subordinate replication node using multi-version database concurrency control based on the subordinate invisibility list.

8. The computer system of claim 7, wherein the operations further comprise:

in response to the next message comprising a transaction commit message for the master transaction, waiting for the subordinate transactions corresponding to master transactions that committed before this master transaction committed, to commit; and committing the subordinate transaction to achieve a same replicated database state on the subordinate replication node as on the master replication node.

9. The computer system of claim 7, wherein the operations further comprise:

in response to the next message comprising a transaction rollback message for the master transaction, rolling back the subordinate transaction.

\* \* \* \* \*